United States Patent
Futaki

(10) Patent No.: US 9,801,086 B2
(45) Date of Patent: Oct. 24, 2017

(54) RADIO COMMUNICATION SYSTEM, RADIO TERMINAL, RADIO STATION, NETWORK APPARATUS, AND INFORMATION COLLECTING METHOD

(71) Applicant: NEC Corporation, Tokyo (JP)

(72) Inventor: Hisashi Futaki, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/348,539

(22) PCT Filed: Sep. 28, 2012

(86) PCT No.: PCT/JP2012/075243
§ 371 (c)(1),
(2) Date: Mar. 28, 2014

(87) PCT Pub. No.: WO2013/047835
PCT Pub. Date: Apr. 4, 2013

(65) Prior Publication Data
US 2014/0228016 A1 Aug. 14, 2014

(30) Foreign Application Priority Data
Sep. 30, 2011 (JP) ................. 2011-218705

(51) Int. Cl.
*H04W 36/00* (2009.01)
*H04W 24/10* (2009.01)

(52) U.S. Cl.
CPC ....... *H04W 24/10* (2013.01); *H04W 36/0055* (2013.01); *H04W 36/0066* (2013.01); *H04W 36/0083* (2013.01)

(58) Field of Classification Search
None
See application file for complete search history.

(56) References Cited

U.S. PATENT DOCUMENTS

2010/0316034 A1* 12/2010 Burbidge .......... H04W 36/0022
370/338
2011/0183661 A1 7/2011 Yi et al.
(Continued)

FOREIGN PATENT DOCUMENTS

| CN | 101931981 A | 12/2010 |
| CN | 102083130 A | 6/2011 |
| CN | 102948202 A | 2/2013 |

OTHER PUBLICATIONS

"Radio measurement collection for Minimization of Drive Tests (MDT)", 3GPP TS 37.320 V2.0.0, 3rd Generation Partnership Project, Technical Specification Group TSG RAN Universal Terrestrial Radio Access (UTRA) and Evolved Universal Terrestrial Radio Access (E-UTRA), Overall description, Stage 2, Release 10, XP003031020, pp. 1-17, Nov. 2010.
(Continued)

*Primary Examiner* — Daniel Lai
(74) *Attorney, Agent, or Firm* — Finnegan, Henderson, Farabow, Garrett & Dunner, L.L.P.

(57) ABSTRACT

The present invention is a radio communication system that a radio terminal obtains measurement information indicated by a radio network in an idle state, and reports the obtained measurement information in an active state, the radio communication system comprising: a first radio station managing a first cell of a first radio access technology comprises in the first cell; notification means configured to notify the radio terminal of the first configuration information related to obtainment of the measurement information in the first cell; and instruction means configured to instruct the radio terminal to report information related to the measurement information obtained in the first cell after the radio terminal moves to a second cell of a second radio access technology different from the first radio access technology.

17 Claims, 19 Drawing Sheets

(56) References Cited

U.S. PATENT DOCUMENTS

| | | | |
|---|---|---|---|
| 2011/0194427 A1* | 8/2011 | Shirota | H04W 36/0022 370/252 |
| 2011/0201279 A1* | 8/2011 | Suzuki | H04W 24/10 455/67.11 |
| 2011/0201324 A1 | 8/2011 | Persson et al. | |
| 2011/0306345 A1* | 12/2011 | Wu | H04W 24/10 455/436 |
| 2012/0088457 A1 | 4/2012 | Johansson et al. | |
| 2013/0016702 A1 | 1/2013 | Yan et al. | |
| 2013/0072182 A1 | 3/2013 | Jung et al. | |

OTHER PUBLICATIONS

Extended European Search Report mailed on Jun. 5, 2015 by the European Patent Office in counterpart European Patent Application No. 12836635.8.

3GPP TS37.320v10.0.0 (<URL> http:www.3gpp.org/ftp/Specs/html-info/37320.htm), Dec. 2010, 17 pages.

3GPP TS32.422v10.4.0 (<URL> http:www.3gpp.org/ftp/Specs/html-info/32422.htm), Jun. 2011, 115 pages.

"Neighboring cell information for logged MDT," ZTE, 3GPP TSG RAN WG2 #71, R2-10 4646, Madrid, Spain, Aug. 2010, 3 pages.

"MDT support for roaming and network sharing scenarios," NTT DOCOMO, Inc., 3GPP TSG-RAN WG2 #70, R2-102997, Montreal, Canada, May 2010, 4 pages.

"Re-configurability of logged MDT measurements," NTT DOCOMO, Inc., 3GPP TSG-RAN2 #70, R2-102906, Montreal, Canada, May 2010, 5 pages.

"Inter-RAT MDT data retrieval and MDT (re)-configuration," Kyocera, 3GPP TSG-RAN WG2 #71, R2-104813, Madrid, Spain, Aug. 2010, 5 pages.

"Idle Mode Logged MDT reporting mechanism," Alcatel-Lucent, 3GPP TSG-RAN WG2 Meeting #69bis, R2-102056, Beijing, China, Apr. 2010, 4 pages.

CATT, "Handling of the Log Available Indication", 3GPP TSG RAN WG2 Meeting #70, R2-102793, May 2010 37.320 V2.0.0, $3^{rd}$ Generation Partnership Project, Technical Specification Group TSG RAN Universal Terrestrial Radio Access (UTRA) and Evolved Universal Terrestrial Radio Access (E-UTRA), Overall description, Stage 2, Release 10, XP003031020, pp. 1-17, Nov. 2010.

Office Action mailed Oct. 24, 2016, by the Chinese Patent Office in counterpart Chinese Patent Application No. 201280048153.2.

* cited by examiner

FIG. 13

| | | | |
|---|---|---|---|
| LogMeasReport ::= | SEQUENCE { | | |
| absoluteTimeStamp | AbsoluteTimeInfo, | | ABSOLUTE TIME |
| traceReference | TraceReference, | | TRACE REFERENCE INFORMATION |
| traceRecordingSessionRef | OCTET STRING (SIZE (2)), | | TRACE COLLECTING SESSION INFORMATION |
| tce-Id | OCTET STRING (SIZE (1)), | | TCE IDENTIFIER |
| logMeasInfoList | LogMeasInfoList, | | LOG INFORMATION LIST |
| logMeasAvailable | ENUMERATED {true} | OPTIONAL | LOG STORING INFORMATION |
| } | | | |
| | | | |
| LogMeasInfoList ::= | SEQUENCE (SIZE (1..maxLogMeasReport)) OF LogMeasInfo | | |
| | | | |
| LogMeasInfo ::= | SEQUENCE { | | LOG INFORMATION |
| locationInfo | LocationInfo | OPTIONAL, | LOCATION INFORMATION |
| relativeTimeStamp | INTEGER (0..7200), | | RELATIVE TIME |
| LogMeasInfo-RAT | CHOICE { | | |
| eutra-LogMeasInfo | Eutra-LogMeasInfo | | LTE LOG INFORMATION |
| utra-LogMeasInfo | Utra-LogMeasInfo | | UMTS LOG INFORMATION |
| } | | | |
| } | | | |
| | | | |
| Eutra-LogMeasInfo ::= | SEQUENCE { | | |
| servCellIdentity | CellGlobalIdEUTRA, | | SERVING CELL ID |
| measResultServCell | SEQUENCE { | | SERVING CELL MEASUREMENT RESULTS |
| rsrpResult | RSRP-Range, | | RSRP |
| rsrqResult | RSRQ-Range, | | RSRQ |
| }, | | | |
| measResultNeighCells | SEQUENCE { | | NEIGHBORING CELL MEASUREMENT RESULTS |
| : | : | | |
| } | | OPTIONAL, | |
| } | | | |
| | | | |
| Utra-LogMeasInfo ::= | SEQUENCE { | | |
| servCellIdentity | CellIdentity, | | SERVING CELL ID |
| measResultServCell | SEQUENCE { | | SERVING CELL MEASUREMENT RESULTS |
| utra-RSCP | INTEGER (-5..91), | | RSCP |
| utra-EcN0 | INTEGER (0..49), | | Ec/No |
| }, | | | |
| measResultNeighCells | SEQUENCE { | | NEIGHBORING CELL MEASUREMENT RESULTS |
| : | : | | |
| } | | OPTIONAL, | |
| } | | | |

RADIO COMMUNICATION SYSTEM, RADIO TERMINAL, RADIO STATION, NETWORK APPARATUS, AND INFORMATION COLLECTING METHOD

CROSS-REFERENCE TO RELATED PATENT APPLICATIONS

This application is a National Stage Entry of International Application No. PCT/JP2012/075243, filed Sep. 28, 2012, which claims priority from Japanese Patent Application No. 2011-218705, filed Sep. 30, 2011. The entire contents of the above-referenced applications are expressly incorporated herein by reference.

TECHNICAL FIELD

The present invention relates to a radio communication system, a radio terminal, a radio station, a network apparatus and an information collecting method.

BACKGROUND ART

In the 3GPP (3rd Generation Partnership Project), in order to reduce operation expense (OPEX) incurred in a drive-test by an operator, utilization of a radio terminal for measurement and report of such information that has been collected by the drive-test or information similar thereto is under study (Non Patent Literature 1). An ultimate object of the above-mentioned study is the minimization of execution of the drive-tests, and the technology related to this study is collectively called "MDT" (Minimization of Drive-Tests). An application target of the MDT is both UMTS (Universal Mobile Telecommunication System) and LTE (Long Term Evolution), which are cellular systems defined in 3GPP. The term "measurement" herein also includes "detecting" a certain specific situation.

In MDT, the following two methods are defined as a method for obtaining (that is, measurement and logging of the measurement results) and reporting measurement information by a radio terminal.

1. Immediate MDT: The method that instructs a radio terminal to obtain and report measurement information in an active state; and 2. Logged MDT: The method that instructs a radio terminal to obtain measurement information in an idle state, and report the obtained measurement information in an active state.

In the study of MDT, making a determination which radio terminal is instructed to obtain and report measurement information in the network side, that is, control of obtaining and reporting measurement information through a radio terminal initiated by the network is a basic principle, and the following two methods are defined in Non Patent Literature 2.

A. Management based method (Management based MDT): The method that first defines an area to be a target for collection of measurement information in MDT, and then select one arbitrarily from radio terminals that stay in the area. It is also called as Area based method (Area based MDT).

B. Signaling based method (Signaling based MDT): The method that selects a specific radio terminal based on an individual ID (Identity) of the radio terminal.

Next, there will be described a logged MDT using a management based method in UTE studied in 3GPP with reference to FIG. 1. As shown in FIG. 1, a system of LTE assumed herein includes a radio terminal UE (User Equipment), a radio base station eNB (evolved NodeB), an network apparatus EPC (Evolved Packet Core) including such as a mobility management apparatus MME (Mobility Management Entity)/a home subscriber management server HSS (Home Subscriber Server) of a radio terminal, a network operation management apparatus EM (Element Manager) (also called as EMS: Element Management System), and trace information collecting apparatus (Trace Collection Entity). Then, in FIG. 1, the logged MDT using the management based method is executed in the following steps. Note that in FIG. 1, the UE is assumed to be in a RRC (Radio Resource Control)_Connected state (active mode) at the start of step S1001.

Step S1001: The UE notifies a connected eNB of terminal capability information (UE Capability Information) on radio access. At this time, support of the logged MDT (logged Measurements Idle) is notified together.

Step S1002: The EM(S) requests the eNB to execute the logged MDT on a management basis (Trace Activation Request). The instruction also includes configuration information necessary for executing the logged MDT.

Step S1003: The eNB selects the UE that is instructed to execute the logged MDT based on the request from the EM(s) as well as terminal capability information of the UE (UE selection). Although not shown in the figure, the eNB obtains in advance consent information (user consent) related to the detailed location information of the UE (e.g. GPS location information) from (MME that is included in) EPC. When necessary to report the detailed location information, the eNB may select a consent UE, and when not necessary, the eNB may select an unconsent UE.

Step S1004: The eNB notifies the UE of configuration information necessary for executing the logged MDT (Logged Measurement Configuration). This notification is also an instruction to execute the logged MDT.

Step S1005: The eNB changes the UE to a RRC_Idle state (idle mode) (RRC Connection Release).

Step S1006: The UE changes to a RRC_Idle state (RRC Connection Release).

Step S1007: The UE performs measurement for signals in the serving cell or neighboring cells at a predetermined timing. Herein, the measurement items may include received power (Reference Signal Received Power: RSRP) or received quality (Reference Signal Received Quality: RSRQ) of a known signal (Reference Signal: RS). Note that the measurement is performed for cell reselection or the like, but not for the logged MDT which is additional.

Step S1008: The UE logs the measurement results (RSRP or RSRQ) at a logging timing indicated by configuration information for the logged MDT. Note that in the specification, a combination of operations in steps S1007 and S1008 (or what includes at least these two operations) is called "logging of measurement results" (Log measurement results) for the sake of simplification, unless specifically described Step S1009: The UE performs a RRC connection request to become a RRC_Connected state in response to a predetermined trigger.

Step S1010: The eNB accepts the RRC connection request and notifies necessary information (RRC Connection Setup).

Step S1011: The UE transmits a confirmation message for RRC connection establishment (RRC Connection Setup Complete). In a series of operations from step S1009 to S1011, a RRC connection is established (RRC Connection Establishment). Herein, the UE that stores record of measurement results (log) transmits a message with the addition of information indicating storing of the log (LogMeasAvailable) in the logged MDT.

Step S1012: The eNB requests a log report when notified of storing the log (UE Information Request (logMeasReportReq)).

Step S1013: The UE reports a log in response to a request of the log report (UE Information Response (LogMeasReport)).

Step S1014: The eNB transfers the reported log to the TCE (Trace Recording Report).

The logged MDT on a management base method is realized through the above-described operations.

In the logged MDT, even when the UE moves from a cell having received configuration information for the logged MDT (that is, requested to execute the logged MDT) to a different cell, it is continued when a destination cell satisfies the predetermined conditions. The predetermined conditions herein are such as a cell that has the same Radio Access Technology (RAT) as the cell having received configuration information for the logged MDT, a cell that belongs to the same PLMN Id (Public Land Mobile Network) as the cell having received configuration information for the logged MDT, or a cell that belongs to a global cell Id (EUT RAN Cell Global Identifier: ECGI) and a tracking area (TA), both of which are indicated by the configuration information.

On the other hand, when a destination cell does not satisfy the predetermined conditions, for example, when moving to a cell of the different RAT, that is, a cell of the different type of system as shown in FIG. 2 (S1105: Cell reselection to UMTS cell), UE stops the logged MDT (S1106: Stop logging measurement results). At this time, the UE does not report a log even when being in a RRC_Connected state (S1109: RRC Connection Setup Complete) for update of location registration in the cell or the like (S1110: Location Update). Meanwhile, the UE restarts the logged MDT when moving again to a cell that satisfies the predetermined conditions. Note that when the UE newly receives configuration information for the logged MDT after moving to a cell that does not satisfy the predetermined conditions (that is, requested to execute the logged MDT), the stored configuration information for the logged MDT or the stored log is overwritten (or discarded).

CITATION LIST

Non-Patent Literature

[Non Patent Literature 1]
3GPP TS37.320v 10.0.0 (<URL> http:www.3gpp.org/ftp/Specs/html-info/37320.htm)
[Non Patent Literature 2]
3GPP TS32.422v 10.4.0 (<URL> http:www.3gpp.org/ftp/Specs/html-info/32422.htm)

SUMMARY OF INVENTION

Technical Problem

Analysis of the related art by the present invention is described below.

In the above-described logged MDT, conceive a case that one UE receives configuration information for the logged MDT in the RAT-A cell (that is, requested to execute the logged MDT), and moves to a different cell of the RAT-B cell after obtaining a log in the RAT-A cell.

The UE goes to a RRC_Connected state (active mode) to perform location registration after moving to the RAT-B cell, and stops the logged MDT. At this time, it is conceived to newly notify the UE of configuration information for the logged MDT in the RAT-B right after moving to the RAT-B cell (e.g. after the completion of location registration procedures), in order to utilize the UE for obtaining measurement information in the logged MDT continuously. But, in order to realize this, the UE is newly notified of configuration information for the logged MDT, so that configuration information received in the RAT-A cell or a log obtained therein is overwritten (or discarded).

In this way, in the logged MDT, upon reselection of a cell between the different RATs, it is impossible to obtain measurement information continuously after the cell reselection. But, in a drive-test, information related to the point on which the UE moves between the different RATs (e.g. receiving quality) is important measurement information for coverage optimization of a cell which takes the different RATs into consideration, and it is conceived to be necessary to have functions for obtaining measurement information continuously even in the logged MDT when the UE performs a cell reselection between the different RATs.

Accordingly, the problem to be solved is to instruct a radio terminal to obtain measurement information continuously without discarding measurement information stored by the radio terminal, when the radio terminal moves between cells of the different RATs, especially when reselecting a cell.

Solution to Problem

The present invention is a radio communication system that a radio terminal obtains measurement information indicated by a radio network in an idle state, and reports the obtained measurement information in an active state, the radio communication system comprising: a first radio station configured to manage a first cell of a first radio access technology comprises in the first cell; notification means configured to notify the radio terminal of the first configuration information related to obtainment of the measurement information in the first cell; and instruction means configured to instruct the radio terminal to report information related to the measurement information obtained in the first cell after the radio terminal moves to a second cell of a second radio access technology different from the first radio access technology.

The present invention is a radio terminal that obtains measurement information indicated by a network in an idle state, and reports the obtained measurement information in an active state, comprising: receiving means configured to receive a first configuration information related to obtainment of the measurement information in a first cell from a first radio station managing the first cell of a first radio access technology, and receive an instruction to report information related to the measurement information obtained in the first cell after moving to a second cell of a second radio access technology different from the first radio access technology; and reporting means configured to report information related to the measurement information in the second cell according to the instruction.

The present invention is a radio station in a radio communication system that a radio terminal obtains measurement information indicated by a network in an idle state, and reports the obtained measurement information in an active state, wherein the radio station is a radio station managing a first cell of a first radio access technology, and comprises:

notification means configured to notify a radio terminal in a first cell of the first configuration information related to obtainment of the measurement information in the first cell; and instruction means configured to instruct the radio terminal to report information related to the measurement information obtained in the first cell after the radio terminal moves to the second cell of a second radio access technology different from the first radio access technology.

The present invention is a network apparatus that instructs a radio station to let a radio terminal to obtain measurement information in an idle state, and report the obtained measurement information in an active state, comprising: notification means configured to notify a radio station managing a first cell of a first radio access technology where the radio terminal stays, of the first configuration information related to obtainment of the measurement information in the first cell by the radio terminal; and instruction means configured to instruct the radio station to let the radio terminal to report information related to the measurement information obtained in the first cell after the radio terminal moves to a second cell of a second radio access technology different from the first radio access technology.

The present invention is an information collecting method that a radio terminal obtains measurement information indicated by a radio network in an idle state, and reports the obtained measurement information in an active state, the method comprising: notifying, in a first cell of a first radio access technology, the radio terminal of a first configuration information related to obtainment of the measurement information in the first cell; and requesting the radio terminal to report information related to the measurement information obtained in the first cell after the radio terminal moves to a second cell of a second radio access technology different from the first radio access technology.

The present invention is an information collecting method that a radio terminal obtains measurement information indicated by a radio network in an idle state, and reports the obtained measurement information in an active state, the method comprising: receiving a first configuration information related to obtainment of the measurement information in the first cell from a first radio station managing a first cell of a first radio access technology, and an instruction to report information related to a first measurement information obtained in the first cell after moving to a second cell of a second radio access technology different from the first radio access technology; and reporting information related to the first measurement information to a second radio station managing the second cell in the second cell according to the instruction.

Advantageous Effect of Invention

According to the present invention, even when reselecting a cell between the different RATs, it is possible to realize to obtain measurement information continuously without discarding the measurement information stored by a radio terminal.

BRIEF DESCRIPTION OF DRAWINGS

FIG. 13 is diagram illustrating an example of the format in the case of reporting in a LTE cell;

DESCRIPTION OF EMBODIMENTS

<Principle of the Invention>

Figure 1:
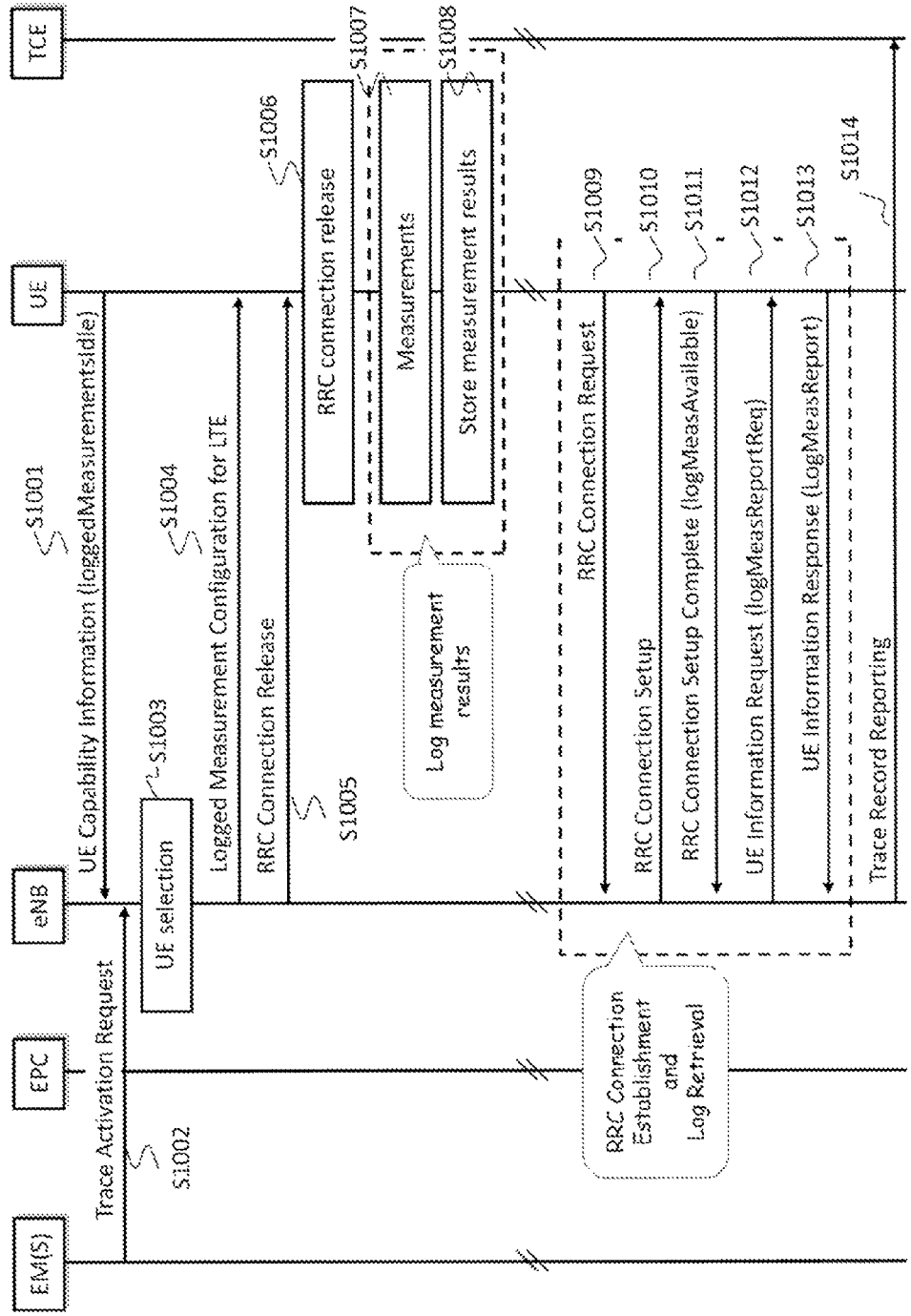
FIG. 1 is a sequence diagram illustrating operations of a radio network and a radio terminal of the logged MDT related to present invention.
Figure 2:
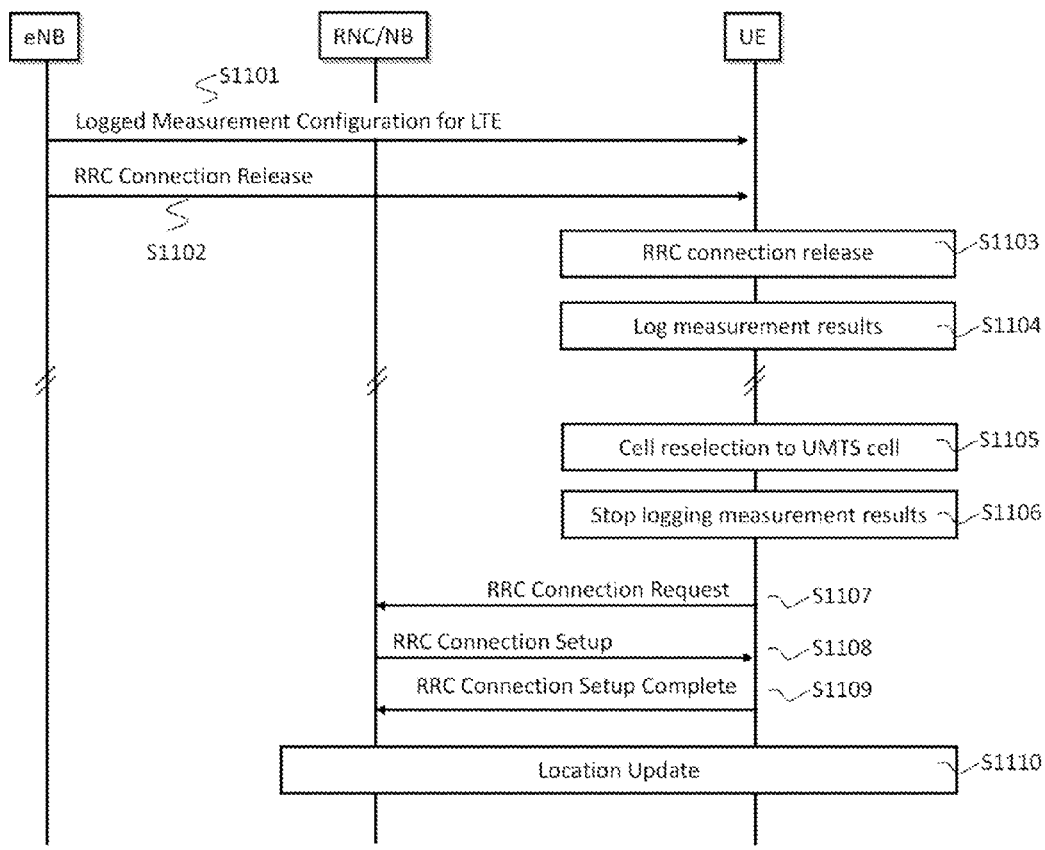
FIG. 2 is another sequence diagram illustrating operations of a radio network and a radio terminal of the logged MDT related to present invention.

A basic principle of the present invention is that a first radio station managing a first cell of a first Radio Access Technology (RAT) notifies a radio terminal, in a first cell, of the first configuration information related to obtainment (acquisition) of the measurement information (first measurement information) in the first cell (that is, measurement and logging of measurement results) in an idle state (also called as idle mode, non-communication state, or non-connection state), and further instructs the radio terminal to report the information related to the measurement information obtained in the first cell to a second radio station of a second Radio Access Technology (RAT) after moving to a second cell of the second Radio Access Technology.

Herein, reporting of information related to the obtained measurement information is the concept that includes information related to whether the measurement information is stored, reporting of the measurement information when storing the measurement information, and further directly reporting of the measurement information without reporting of information related to whether the measurement information is stored when storing the measurement information.

The radio terminal having received the instruction reports to the second base station, storing the first measurement information after moving from the first cell to the second cell, when having obtained the measurement information in the first cell (that is, first measurement information).

The second radio station actually instructs the radio terminal to report the first measurement information when collecting the first measurement information, and the radio terminal reports the first measurement information. Herein, an instruction for reporting the first measurement information in the second cell, which is given from the first radio station to the radio terminal, may be notified in advance by a predetermined message. Also, consensus between the radio station and the radio terminal may be built in advance or some definitions may be provided in the specification so that a notification of the first configuration information has a meaning of the instruction.

Further, the radio terminal may report the first measurement information to the second radio station without reporting that the radio terminal stores the first measurement information, or without performing the instruction from the second radio station. Herein, reporting that the radio terminal stores the first measurement information after moving from the first cell to the second cell, and/or reporting of the first measurement information is/are performed while the radio terminal is in an active state (also called as active mode, communication state or connected state). As timing for executing the reporting, for example, the following methods are conceived: the method performed in association with steps of updating of location registration (that is, location re-registration) by moving between the cells having different radio access technologies (RATs), or the method performed after completing update of location registration. However, the present invention is not limited to these methods.

Further, another basic principle of the present invention is described. The first radio station in the first cell requests the radio terminal to obtain (or obtain and report) the measurement information (that is, second measurement information) in the second cell after the radio terminal moves from the first cell to the second cell. After moving to the second cell, the radio terminal reports reception of the request to the second radio station (report of receiving a request), or performs an inquiry to the second radio station whether it is necessary to obtain the second measurement information (e.g. a determination request for determining whether it is necessary to obtain the second measurement information). Herein, a request for obtaining the second measurement information by the first radio station is conceived to be made by a method that notifies the request indicating information (e.g., flag or predetermined message), or by a method that notifies the second information related to obtainment (acquisition) of the second measurement information in the second cell, or the like.

Further, it is conceivable that the radio terminal executes in the second cell reporting of receiving the request, or the determination request to the second radio station by a method that notifies information indicating reception of the request (e.g. flag or predetermined message), or by a method that reports the received second configuration information (when having received in the first cell), or the like.

Further, the second station notifies the radio terminal of information (e.g. flag or predetermined message) indicating an instruction to obtain (report) the second measurement information, or the second configuration information when utilizing the radio terminal for obtaining (reporting) the second measurement information. Herein, when the radio terminal already stores the second configuration information, the second radio station may be configured to notify the radio terminal of some of the second configuration information.

Further, movement (moving) herein means to change a cell for staying from the first (or second) cell to the second (first) cell, regardless of the fact whether the radio terminal physically moves its own location. Also, elements of information included in the first and second information (that is, measurement item) may be the same, or some of or all elements may be different.

Further, as conditions for application of the present invention, it is conceived that the radio terminal can stay (or permitted to stay) in the second cell, or the second cell belongs to a target area for obtaining (or reporting) the measurement information, or the like, but the present invention is not limited to these conditions.

For example, the following items are conceived as an item of measurement information.

Received power of a known signal in staying cells or neighboring cells;

Received quality of a known signal in staying cells or neighboring cells;

Receiving failure information of a common control signal;

Transmission failure information of an access signal;

Radio link failure information; and

Location information

A staying cell is also called a serving cell or a camping cell, and a known signal is also called a pilot signal or a reference signal. As received quality, there is a ratio of signal power to interference signal power (Signal power to Interference power Ratio: SIR) for a desired wave (desired signal), or a ratio of signal power to interference and noise power (Signal power to Interference and Noise power Ratio: SINR) or the like, but the present invention is not limited to thereto.

Receiving failure information of a common control signal relates to system information to be broadcasted or information related to receiving failure of paging information, and failure information of an access signal corresponds to information that the radio terminal fails to transmit a random access signal or the like used for establishing a radio link with the radio station. Radio link failure information relates to the information that a radio link established between the radio terminal and the radio station is unintentionally disconnected (that is, being in a state that a radio link is not maintained), and this state is generally called RLF (Radio Link Failure).

Further, location information relates to the information on an area where the radio terminal stays, the information stored by the radio terminal at the time of logging the measurement information, and for example, location information obtained by GNSS (Global Navigation Satellite System) typified by GPS, or location information computed by an OTDOA (Observation Time Difference Of Arrival) method which specify the location by using a time difference of receiving a signal from a plurality of base stations such as a radio base station, is conceived.

For example, the followings are conceived as configuration information.

Absolute time that is a basis to start logging measurement information;
Recording duration of measurement information;
Recording interval of measurement information;
Recording target area of measurement information; and
Trace related information.

Measurement item information is the information that indicates an item of the above-described measurement information. A logging duration is a duration during which the measurement results should be logged, and a logging interval is an interval at which the measurement results are to be logged.

Meanwhile, for example, the following three methods are conceived as a request, which is made by the first radio station, to report the first measurement information obtained in the first cell after the radio terminal moves from the first cell to the second cell.

1) Notifying information (e.g., flag or predetermined message) that gives an instruction to report the first measurement information in the second cell;

2) Notifying the second configuration information related to obtainment (acquisition) (or, obtainment and reporting) of measurement information in the second cell; and 3) Notifying information that gives an instruction to continue obtaining (or, obtaining and reporting) measurement information in the second cell.

When using the methods 2 and 3, for example, the radio terminal only has to recognize in advance (e.g. defined in the specification) that these notifications request reporting of the first measurement information in the second cell.

Next, for example, the following two methods are conceived as a request, which is made by the first radio station, to obtain (and report) the measurement information (second measurement information) in the second cell after the radio terminal moves from the first cell to the second cell.

a) Notifying the second configuration information related to obtainment (acquisition) (or, obtainment and reporting) of measurement information in the second cell; and b) Notifying information that gives an instruction to continue obtaining (or, obtaining and reporting) measurement information in the second cell.

Herein, the above method 2) or the method 3) is related to the method a) or the method b) respectively That is, when notified of the second configuration information in the case of using the method 1), the notification has a meaning of the method a), and in the case of using the method 2), the notification has a meaning of either only the method 2), or the both method 2) and method a). Much the same is true on the method 3) and method b).

Also, when the radio terminal has received in the first cell, the second configuration information for obtaining (and reporting) measurement information in the second cell and has been given a request to obtain (and report) measurement information in the second cell, it is conceived to report the request in the second cell by the following two methods.

A) Reporting of information that indicates storing the configuration information for the second cell; and B) Reporting of the stored (e.g., having received in the first cell) configuration information for the second cell.

Further, for example, in the case that the radio station instructs the radio terminal to obtain (and report) measurement information in the second cell when receiving a report of the above A) or B) from the radio terminal, it is conceived to give an instruction by the following two methods.

C) Instruction to continue obtaining measurement information in the second cell; and D) Notification of configuration information in the second cell.

Herein, the above method A) and method B) may be made to correspond to the method C) and method D) respectively, or the method A) and the method D), the method B) and the method C) or the like, any combination is also possible.

The configuration information for the second cell (that is, second configuration information) by the method B) or the method D) may include items (or information) similar to those of the first configuration information, or may be partial information corresponding to only some of the items (or information) included in the first configuration information. When missing an amount of information in comparison with the first configuration information (that is, partial information of the first configuration information), as for the missing items in the second configuration information (e.g. missing items in comparison with the first configuration information), the radio terminal reuses the items in the first configuration information. Herein, it is conceived that reuse refers to the processes such as:

Taking over (or, using) configured values or the like as they are;

Continuing values such as a timer and a counter; and

Reading (or translating) measurement item information or the like of the first RAT into those of the second RAT, but the present invention is not limited to these processes.

Further, in the case when the radio terminal stores in advance (or, defined in the specification) some of information related to obtainment of measurement information, for example, an item of measurement information to be a target (that is, a measurement item), it is conceived to change such information into the corresponding RAT one when changing Radio Access Technology (RAT).

By executing the present invention described above, the radio terminal is able to report measurement information even when moving between the cells having different radio access technologies (RATs), and collecting the measurement information in the radio station or in the upper network (or network apparatus) that manages the radio station.

Further, it is possible to instruct the radio terminal to obtain measurement information continuously even in the second cell, thereby to collect the measurement information as needed. Therefore, this makes it possible to understand radio wave environments (e.g. received power or received quality in each RAT, or a degree of the cell overlapping between different RATs) in the area where the radio terminal moves between the cells of different RATs, or around the area, thereby enabling to realize coverage optimization or mobility optimization, which takes the cells of multiple RATs into consideration.

It is described by a distinction between the first radio station and second radio station, but one radio station may have functions of both the first radio access technology (RAT) and second radio access technology (RAT)

Further, it is also conceived that a notification of configuration information related to obtainment of measurement information performed from the radio station to the radio terminal (that is, instruction to obtain measurement information) is executed by giving an instruction from an upper network apparatus or an upper network management apparatus, which manages the radio station, to the radio station. For example, more specifically, it is conceived that the network management apparatus notifies the radio station of configuration information either through the network apparatus, or directly.

Hereafter, the embodiments of the present invention will be described.

<First Embodiment>

A first embodiment of the present invention will be described with reference to FIG. 3 to FIG. 5.

Figure 3:
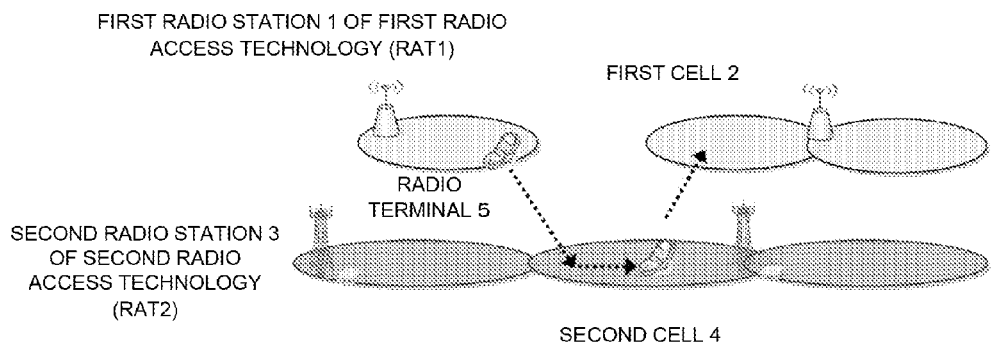
FIG. 3 is a diagram illustrating the configuration of a radio communication system in accordance with a first embodiment of the present invention.

FIG. 3 is a diagram illustrating a radio communication system in accordance with a first embodiment of the present invention. The radio communication system in the first embodiment includes a first radio station 1 having a function of the first Radio Access Technology (RAT1), a first cell 2 provided by the first radio station, a second radio station 3 having a function of the second Radio Access Technology (RAT2), a second cell 4 provided by the second radio station, and a terminal 5 having the functions of both RAT1 and RAT2. Herein, in the following descriptions, the first radio station 1 is differentiated from the second radio station 3, but the first radio station 1 or the second radio station 3 may have the functions of both RAT1 and RAT2.

Figure 4:
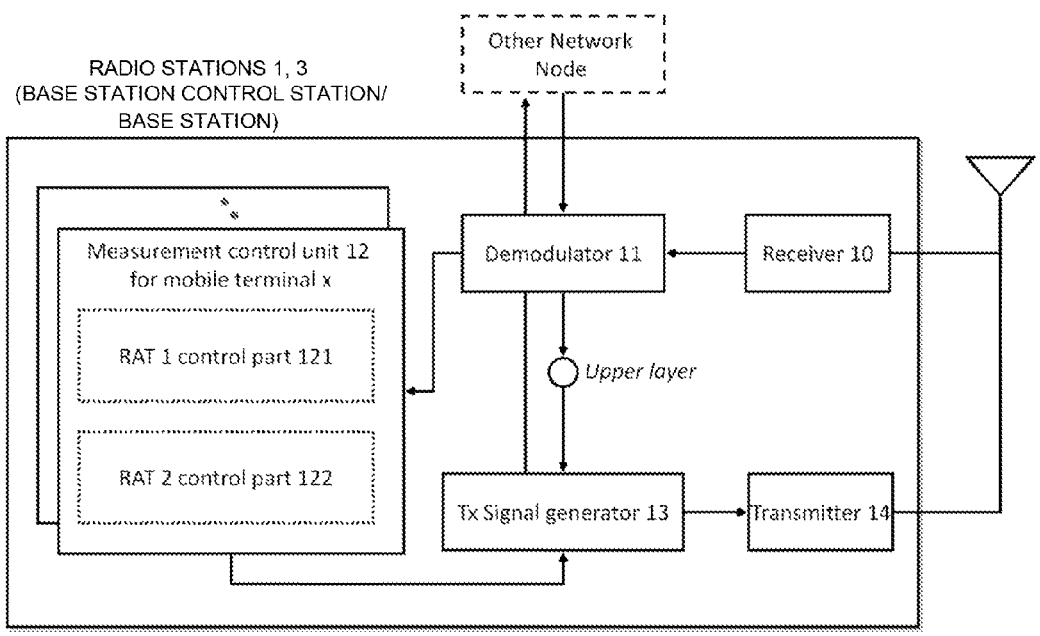
FIG. 4 is a block diagram of a radio station in accordance with the present invention.
Figure 5:
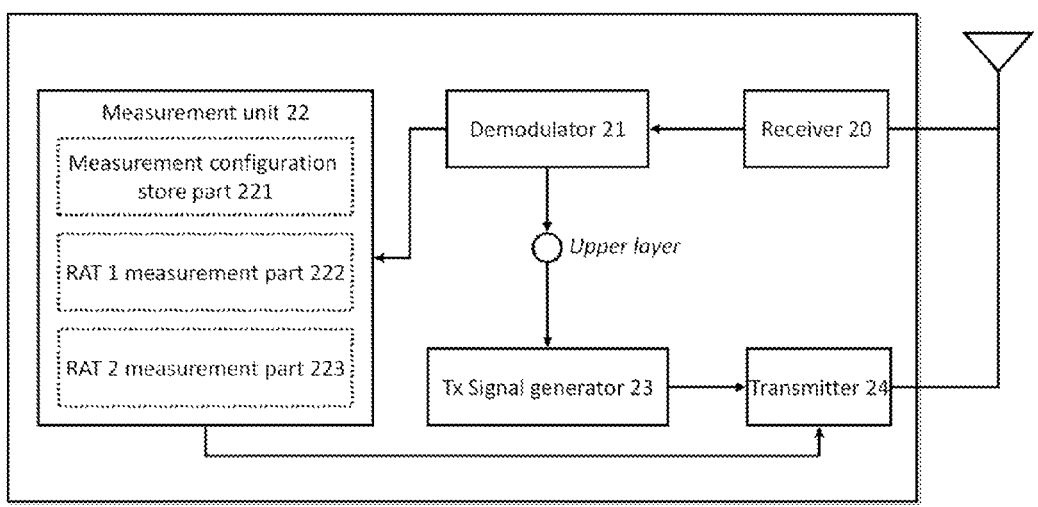
FIG. 5 is a block diagram of a radio terminal in accordance with the present invention.

A function block diagram of the radio stations 1 and 3 will described in FIG. 4 and a function block diagram of the radio terminal 5 will described in FIG. 5.

In FIG. 4, the radio stations 1 and 3 include a receiver 10 that receives a radio signal from the radio terminal 5, a demodulator 1I that demodulates a signal received from the radio terminal 5 or other network nodes, a measurement control unit 12 that gives an instruction to measure quality of the received signal or the like per radio terminal, a signal generator (Tx signal generator) 13 that generates signals for a radio terminal or other networks, and a transmitter 14 that transmits a radio signal to the radio terminal 5.

The measurement control unit 12 is further divided to a part 121 for measurement control in RAT1 (RAT1 control part), and a part 122 for measurement control in RAT2 (RAT2 control part).

A radio base station or a base station control station managing the radio base station are conceived, as the radio stations 1 and 3.

In FIG. 5, the radio terminal 5 includes a receiver 20 that receives a radio signal from the radio stations 1 and 3, a demodulator 21 that demodulates the received signal, a measurement unit 22 that measures quality of the received signal or the like, signal generator (Tx signal generator) 23 that generates signals for the radio stations 1 and 3, and a transmitter 24 that transmits a radio signal to the radio stations 1 and 3.

The measurement unit 22 is further divided to a part 221 for storing control information related to measurement (Measurement configuration store part), and a part 222 for measuring in RAT1 (RAT1 measurement part) and a part 223 for measuring in RAT2 (RAT2 measurement part).

The configuration of function blocks in FIG. 4 and FIG. 5 is one of the examples, and the present invention is not limited to be applied to such configurations.

Next, the exemplary embodiments in accordance with the above-described embodiments will be described.

<Exemplary Embodiment 1>

Figure 6:
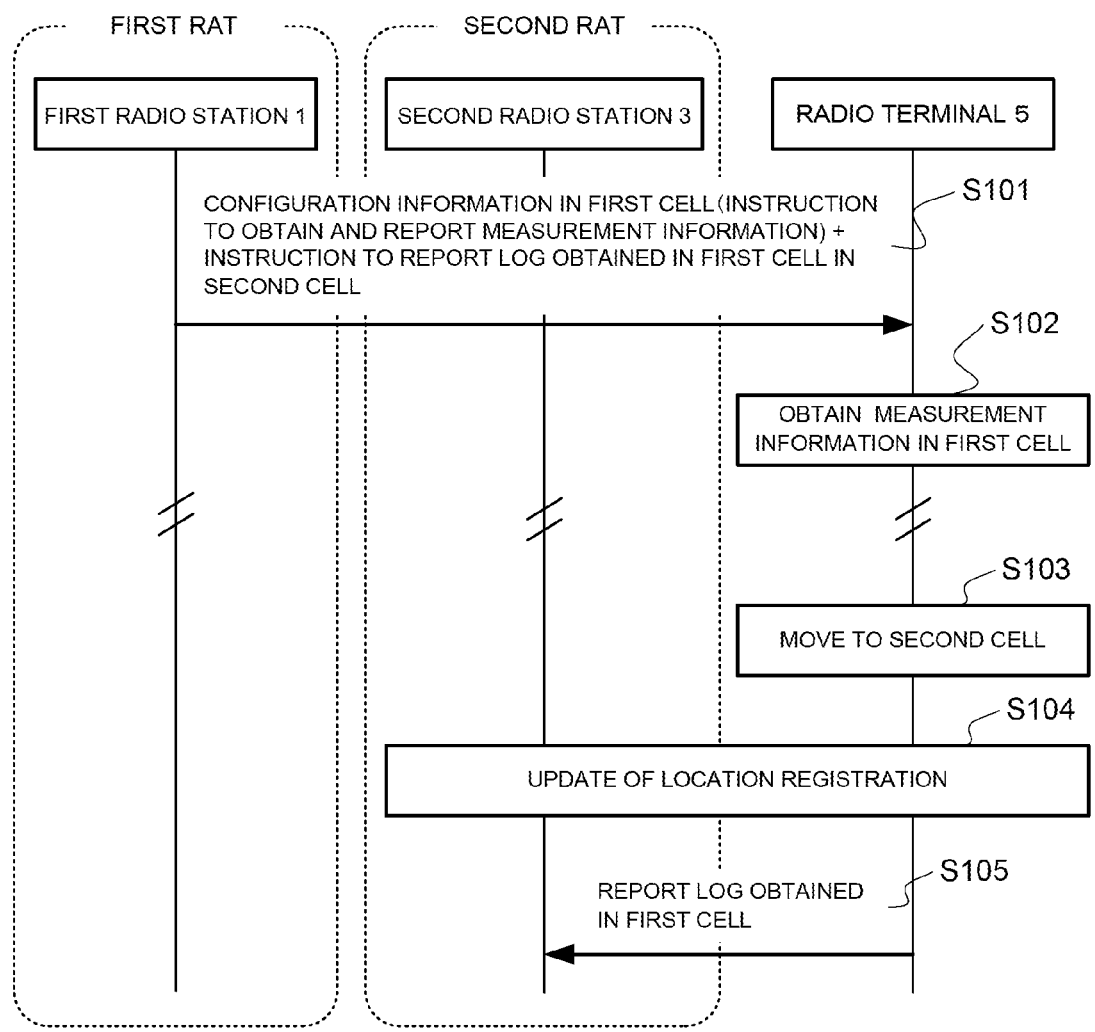
FIG. 6 is a sequence diagram illustrating operations of a radio station and a radio terminal in accordance with a first exemplary embodiment of the present invention.

A first exemplary embodiment of the present invention will be described. FIG. 6 is a sequence diagram illustrating operations of a radio station and a radio terminal in accordance with a first exemplary embodiment. In the first exemplary embodiment, the first radio station instructs the radio terminal to obtain (that is, measurement and logging of measurement results) and report measurement information in the first cell (that is, first measurement information), and to report the first measurement information in the second cell.

Step S101: The first radio station 1 notifies the radio terminal 5 of the configuration information in the first cell 2 (that is, instruction to obtain and report measurement information). The first radio station 1 also gives an instruction to report measurement information (that is, log), which is obtained in the first cell 2, in the second cell 4. At this time, the first radio station 1 notifies the radio terminal 5 of at least the first configuration information. Herein, this notification and instruction may be performed to be multiplexed on the same message, and or performed by different messages.

Step S102: The radio terminal 5 obtains the measurement information (that is, first measurement information) in the first cell 2.

Step S103: The radio terminal 5 moves to the second cell 4. Movement herein means to change a cell for staying from the first cell 2 to the second cell 4, regardless of the fact whether the radio terminal 5 physically moves its own location.

Step S104: Update of location registration is performed by movement of the radio terminal 5 from the first cell 2 to the second cell 4.

Step S105: In the second cell 4, the radio terminal 5 reports a log of the first measurement information obtained in the first cell 2 to the second radio station 3. Herein, the radio terminal 5 may perform a report so as to identify a log of the first measurement information. For example, the radio terminal 5 adds into the head of a log of the first measurement information, information that indicates Radio Access Technology (RAT) corresponding to the log. Alternatively, for example, the radio terminal 5 adds into the end of a log of the first measurement information, information that indicates the first RAT, but the method for identifying a log is not limited to these methods. In addition, the radio terminal 5 may add to a log, information for identifying correspondence between RAT and measurement information, when obtaining measurement information.

An instruction for reporting the first measurement information in the second cell, which is performed by the first radio station to the radio terminal, may be notified by a predetermined message. Also, consensus between the radio station and the radio terminal may be built in advance or some definitions may be provided in the specification so that a notification of the first configuration information has a meaning of the instruction. Further, a step of updating location registration and a step of reporting a log obtained in the first cell may be performed in reverse order, or performed concurrently or in parallel as a series of operations.

The foregoing steps allow to realize continual obtainment (acquisition) of measurement information even when the radio terminal moves between different radio access technologies (RATs). This makes it possible to understand radio wave environments in the area where the radio terminal moves between the cells of different RATs, or around the area, thereby enabling to realize coverage optimization or mobility optimization, which takes the cells of multiple RATs into consideration.

<Exemplary Embodiment 2>

A second exemplary embodiment of the present invention will be described.

Figure 7:
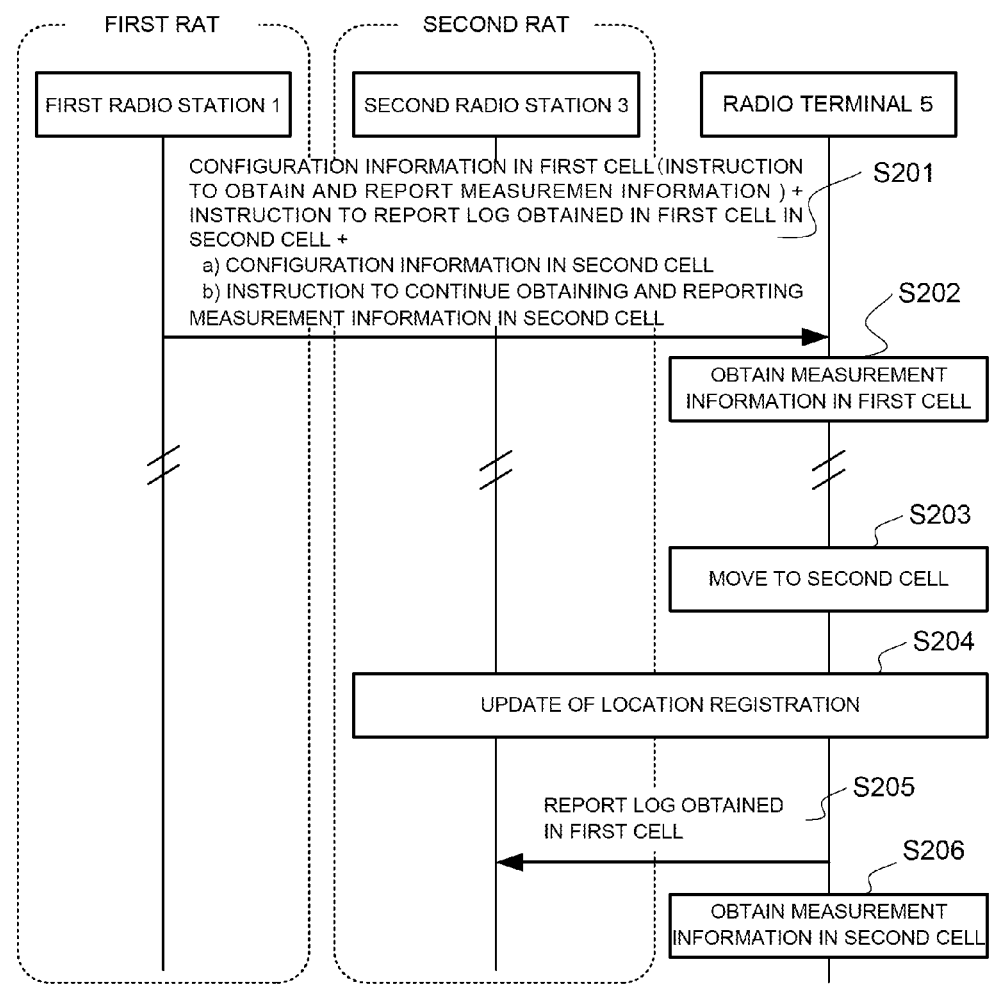
FIG. 7 is a sequence diagram illustrating operations of a radio station and a radio terminal in accordance with a second exemplary embodiment of the present invention.

FIG. 7 is a sequence diagram illustrating operations of a radio station and a radio terminal in accordance with a second exemplary embodiment. In the second exemplary embodiment, the first radio station instructs the radio terminal to obtain (that is, measurement and logging of the measurement results) and report the measurement information (that is, first measurement information) in the first cell, to report the first measurement information in the second cell, and to obtain and report the measurement information (that is, second measurement information) in the second cell. Then, the radio terminal moves from the first cell to the second cell, and obtains (and reports) the second measurement information (for example, autonomously), even if not receiving obtainment (acquisition) (reporting) of the second measurement information from the second radio station after reporting the first measurement information.

Step S201: The first radio station 1 notifies the radio terminal 5 of the configuration information in the first cell 2 (that is, instruction to obtain and report measurement information), and an instruction to report the measurement information of the first cell 2 (that is, log) in the second cell 4. Also, the first radio station 1 performs a) notification of the configuration information in the second cell 4 to the radio terminal 5 (that is, instruction to obtain and report measurement information), or b) instruction continuation of obtaining and reporting the measurement information in the second cell to the radio terminal 5.

This notification or instruction may be performed to be multiplexed on the same message, or performed by different messages.

Step S202: The radio terminal 5 obtains the measurement information (that is, first measurement information) in the first cell 2.

Step S203: The radio terminal 5 moves to the second cell 4. Movement herein means to change a cell for staying from the first cell 2 to the second cell 4, regardless of the fact whether the radio terminal physically moves its own location. The radio terminal 5 executes the process to reuse the first configuration information, when not receiving in advance the configuration information for the second cell 4 (that is, the second configuration information), or the second configuration information is partial (that is, information is not sufficient) compared with the configuration information in the first cell 2 (that is, first configuration information).

Step S204: Update of location registration is performed by movement of the radio terminal 5 from the first cell 2 to the second cell 4.

Step S205: In the second cell 4, the radio terminal 5 reports a log of the first measurement information obtained in the first cell 4 to the second radio station 3. Herein, the radio terminal 5 may perform a report so as to identify a log of the first measurement information. For example, the radio terminal 5 adds into the head of a log of the first measurement information, information that indicates Radio Access Technology (RAT) corresponding to the log. Also, for example, the radio terminal 5 adds into the end of a log of the first measurement information, information that indicates the first RAT, but the method for identifying a log is not limited to these methods. In addition, the radio terminal 5 may add to a log, information for identifying correspondence between RAT and measurement information, when obtaining measurement information.

Step S206: The radio terminal 5 obtains the second measurement information in the second cell 4 according to the first configuration information and/or the second configuration information.

A step of updating location registration and a step of reporting a log obtained in the first cell may be performed in reverse order, or performed concurrently or in parallel as a series of operations.

The foregoing steps allow to realize continual obtainment of measurement information even when the radio terminal moves between different radio access technologies (RATs). This makes it possible to understand radio wave environments in the area where the radio terminal moves between the cells of different RATs, or around the area, thereby enabling to realize coverage optimization or mobility optimization, which takes the cells of multiple RATs into consideration.

<Modification 1 of Exemplary Embodiment 2>

Figure 8:
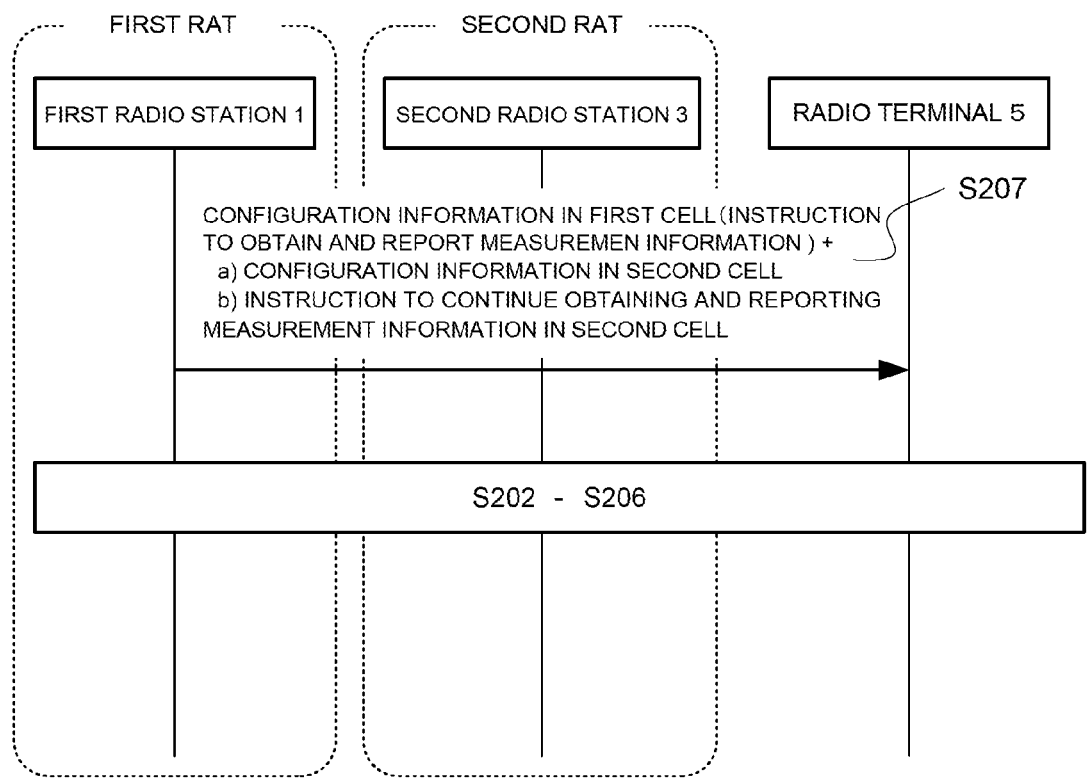
FIG. 8 is a sequence diagram illustrating operations of a radio station and a radio terminal in accordance with a first modification in a second exemplary embodiment of the present invention.

FIG. 8 is a sequence diagram illustrating operations of a radio station and a radio terminal in accordance with a first modification in a second exemplary embodiment of the present invention. The difference from the second exemplary embodiment lies in that an instruction to report the first measurement information, which is obtained in the first cell, in the second cell is not performed as an independent message (or information) that indicates the instruction as in the second exemplary embodiment, but is performed by giving a meaning of the instruction to another instruction to obtain and report the second measurement information in the second cell, or the radio terminal makes recognition in such a way.

Step S207: The first radio station 1 notifies the radio terminal 5 of the configuration information in the first cell 2 (that is, instruction to obtain and report measurement information). Also, the first radio station 1 performs a) notification to the radio terminal 5 of the configuration information in the second cell 4 (that is, instruction to obtain and report measurement information), or b) instruction to the radio terminal 5 of continuation of obtaining and reporting the measurement information in the second cell.

At this time, the radio station 1 notifies the radio terminal 5 of at least the first configuration information. This notification or instruction may be performed to be multiplexed on the same message, and or performed by different messages.

Step S202: The radio terminal 5 obtains the measurement information (that is, first measurement information) in the first cell 2.

Step S203: The radio terminal 5 moves to the second cell 4. Movement herein means to change a staying cell from the first cell 2 to the second cell 4, regardless of the fact whether the radio terminal physically moves its own location. The radio terminal 5 executes the process to reuse the first configuration information, when not receiving in advance the second configuration information, or the second configuration information is partial (that is, information is not sufficient) compared with the first configuration information.

Step S204: Update of location registration is performed by movement of the radio terminal 5 from the first cell 2 to the second cell 4.

Step S205: In the second cell 4, the radio terminal 5 reports a log of the first measurement information obtained in the first cell 4 to the second radio station 3. Herein, the radio terminal 5 may perform a report so as to identify a log of the first measurement information. For example, the radio terminal 5 adds into the head of a log of the first measurement information, information that indicates Radio Access Technology (RAT) corresponding to the log. Also, for example, the radio terminal 5 adds into the end of a log of the first measurement information, information that indicates the first RAT, but the method for identifying a log is not limited to these methods. In addition, the radio terminal 5 may add to a log, information for identifying correspondence between RAT and measurement information, when obtaining measurement information.

Step S206: The radio terminal 5 obtains the second measurement information in the second cell 4.

The foregoing steps allow to realize continual obtainment (acquisition) of measurement information even when the radio terminal moves between different radio access technologies (RATs). This makes it possible to understand radio wave environments in the area where the radio terminal moves between the cells having different RATs, or around the area, thereby enabling to realize coverage optimization or mobility optimization, which takes the cells having multiple RATs into consideration.

<Modification 2 of Exemplary Embodiment 2>

Figure 9:
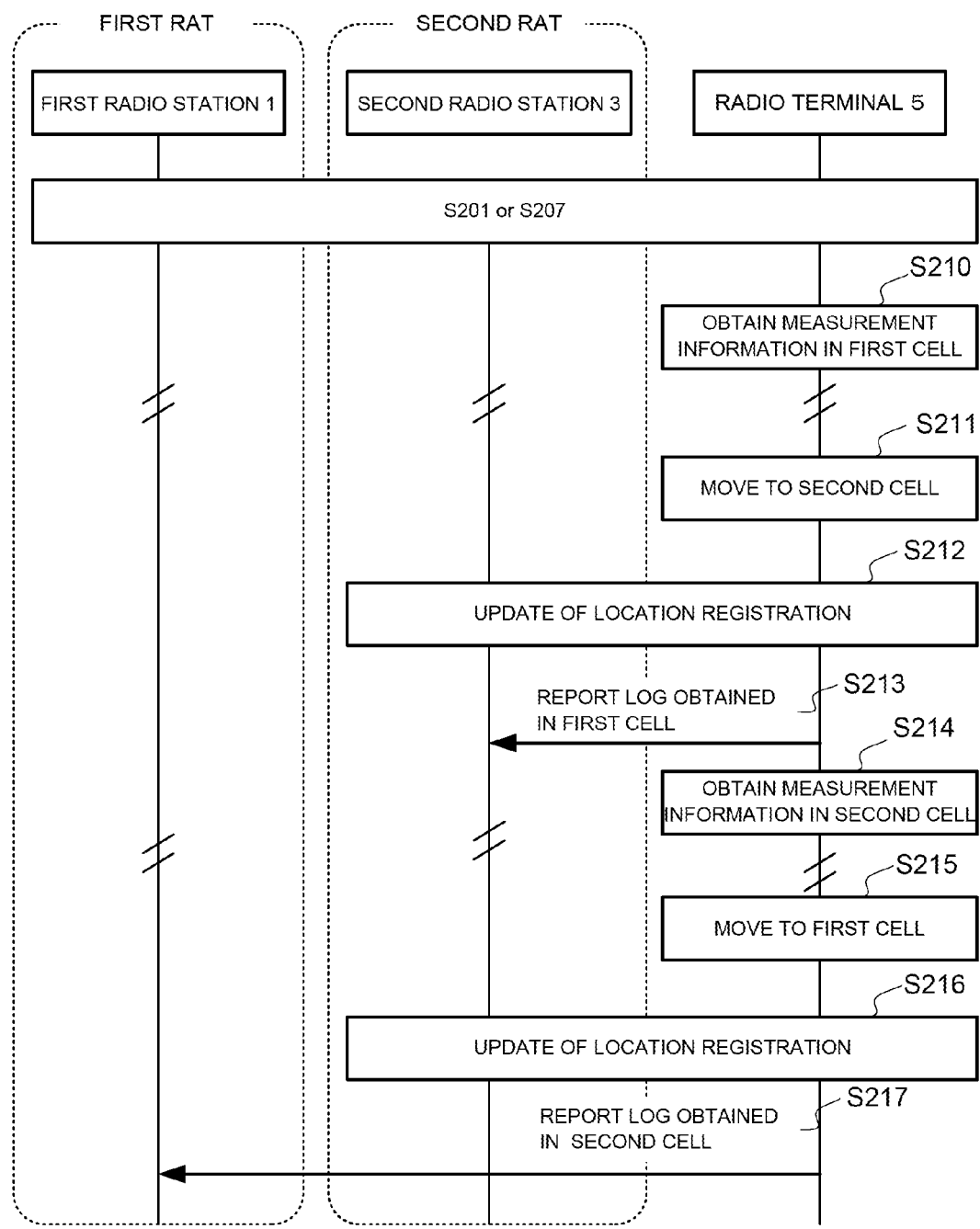
FIG. 9 is a sequence diagram illustrating operations of a radio station and a radio terminal in accordance with a second modification in a second exemplary embodiment of the present invention.

FIG. 9 is a sequence diagram illustrating operations of a radio station and a radio terminal in accordance with a second modification in a second exemplary embodiment of the present invention. The difference from the second exemplary embodiment lies in that the radio terminal given an instruction to obtain and report the second measurement information in the second cell reports the second measurement information in the first cell after moving to the first cell again.

Step S201: The first radio station 1 notifies the radio terminal 5 of the configuration information in the first cell 2 (that is, instruction to obtain and report). Also, the first radio station 1 gives a) an instruction to report the measurement information (log) of the first cell 2 in the second cell 4, and the configuration information in the second cell 4 (that is, instruction to obtain and report), or b) an instruction to continue obtaining and reporting the measurement information in the second cell 4.

Or, Step S207: The first radio station 1 notifies the radio terminal 5 of the configuration information in the first cell 2 (that is, instruction to obtain and report). Also, the first radio station 1 a) notifies the radio terminal 5 of the configuration information in the second cell 4 (that is, instruction to obtain and report), or b) instructs the radio terminal 5 to continue obtaining and reporting the measurement information in the second cell. This notification or instruction may be performed to be multiplexed on the same message, and or performed by different messages.

Step S210: The radio terminal 5 obtains the measurement information (that is, first measurement information) in the first cell 2.

Step S211: The radio terminal 5 moves to the second cell 4. Movement herein means to change a cell for staying from the first cell 2 to the second cell 4, regardless of the fact whether the radio terminal physically moves its own location. The radio terminal 5 executes the process to reuse the first configuration information, when not receiving in advance the second configuration information, or the second configuration information is partial (that is, information is not sufficient) in comparison with the first configuration information.

Step S212: Update of location registration is performed by movement of the radio terminal 5 from the first cell 2 to the second cell 4.

Step S213: In the second cell 4, the radio terminal 5 reports a log of the first measurement information obtained in the first cell 4 to the second radio station 3. Herein, the radio terminal 5 may perform a report so as to identify a log of the first measurement information. For example, the radio terminal 5 adds into the head of a log of the first measurement information, information that indicates Radio Access Technology (RAT) corresponding to the log. Also, for example, the radio terminal 5 adds into the end of a log of the first measurement information, information that indicates the first RAT, but the method for identifying a log is not limited to these methods. In addition, the radio terminal 5 may add to a log, information for identifying correspondence between RAT and measurement information, when obtaining measurement information.

Step S214: The radio terminal 5 obtains the second measurement information in the second cell 4.

Step S215: The radio terminal 5 moves to the second cell 4 again. Movement herein means to change a cell for staying from the first cell 2 to the second cell 4, regardless of the fact whether the radio terminal physically moves its own location. The radio terminal 5 executes the process to reuse the first configuration information, when not receiving in advance the second configuration information, or the second configuration information is partial (that is, information is not sufficient) in comparison with the first configuration information.

Step S216: Update of location registration is performed by movement of the radio terminal 5 from the first cell 2 to the second cell 4.

Step S217: In the first cell 2, the radio terminal 5 reports a log of the first measurement information obtained in the second cell 4 to the first radio station 2. Herein, the radio terminal 5 may perform a report so as to identify a log of the first measurement information. For example, the radio terminal 5 adds into the head of a log of the first measurement information, information that indicates Radio Access Technology (RAT) corresponding to the log. Also, for example, the radio terminal 5 adds into the end of a log of the first measurement information, information that indicates the first RAT, but the method for identifying a log is not limited to these methods. In addition, the radio terminal 5 may add to a log, information for identifying correspondence between RAT and measurement information, when obtaining measurement information.

The foregoing steps allow to realize continual obtainment (acquisition) of measurement information even when the radio terminal moves between different radio access technologies (RATs). In particular, the present invention allows to collect the measurement information continuously, even when the radio terminal moves from the cell of the RAT (RAT-A) in which the radio terminal receives an instruction to obtain and report the measurement information to the cell of other RAT (RAT-B) and moves to the RAT-A cell again (that is, come back). This makes it possible to understand radio wave environments in the area where the radio terminal moves between the cells of different RATs, or around the area, thereby enabling to realize coverage optimization or mobility optimization, which takes the cells of multiple RATs into consideration.

<Exemplary Embodiment 3>

A third exemplary embodiment of the present invention will be described.

Figure 10:
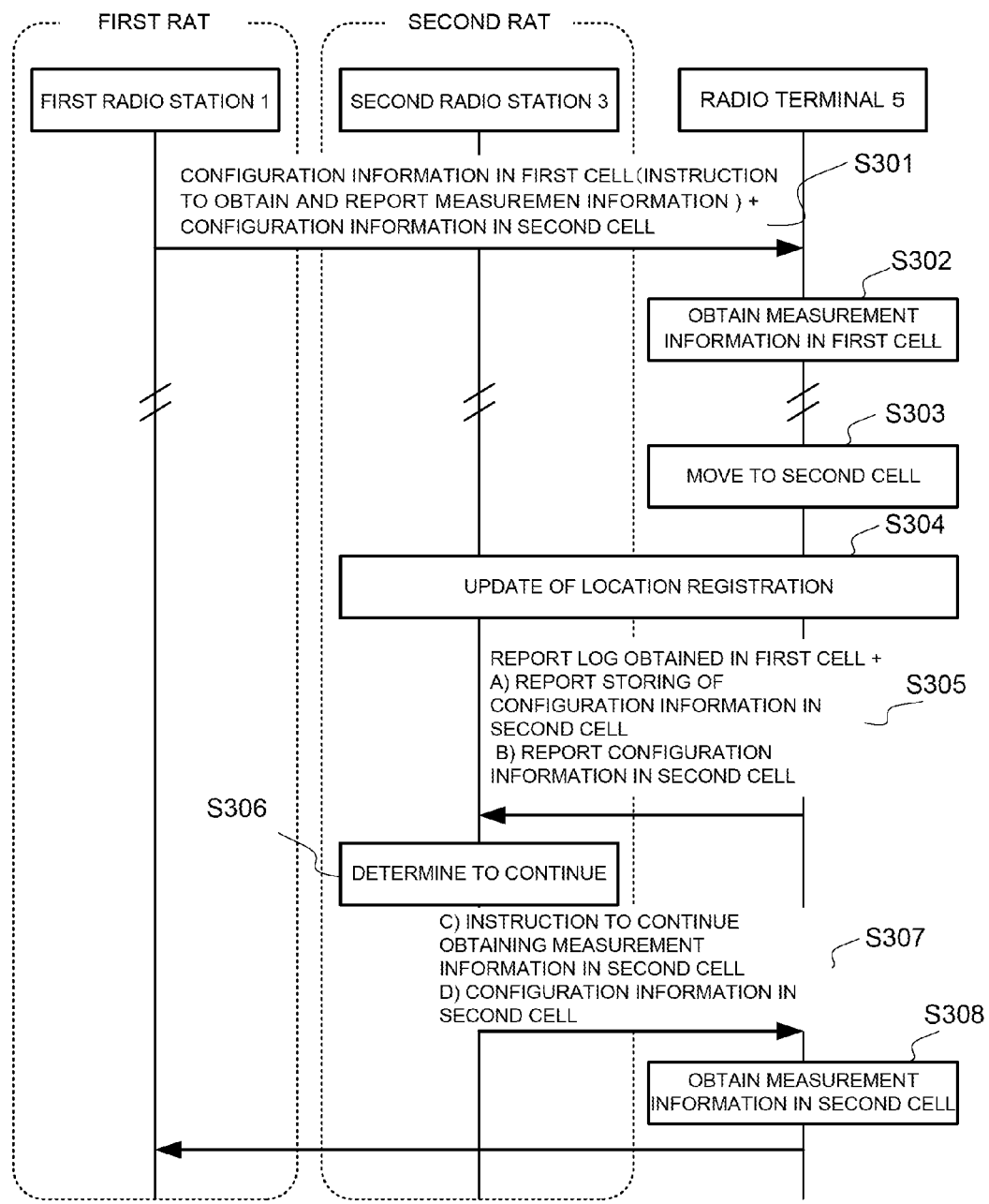
FIG. 10 is a sequence diagram illustrating operations of a radio station and a radio terminal in accordance with a third exemplary embodiment of the present invention.

FIG. 10 is a sequence diagram illustrating operations of a radio station and a radio terminal in accordance with a third exemplary embodiment of the present invention. In the third exemplary embodiment, the first radio station instructs the radio terminal to obtain (that is, measurement and logging of the measurement results) and report the measurement information in the first cell (that is, first measurement information), and to report the first measurement information in the second cell, and the first radio station also requests the radio terminal to obtain and report the measurement information (that is, second measurement information) in the second cell (that is, transmission of "configuration information in the second cell"). The radio terminal reports to the second radio station, the first measurement information and reception of a request to obtain (or obtain and report) the second measurement information from the first radio station, when moving from the first cell to the second cell. The radio terminal reports the reception of a request to obtain (or obtain and report) the second measurement information to the second radio station 3 by transmitting, for example, "A) a report of storing the configuration information in the second cell", or "B) a report of the configuration information for the second cell". The second radio station 3 having received the report determines whether to let the radio terminal to obtain the second measurement information, and gives an instruction to obtain (and report) the second measurement information when letting the radio terminal to obtain such information. The second radio station 3 gives an instruction to obtain (or obtain and report) the second measurement information by transmitting, for example, "C) an instruction to continue obtaining the measurement information in the second cell", or "D) the configuration information in the second cell". The radio terminal obtains (and reports) the second measurement information in the second cell when receiving the instruction from the second radio station.

Step S301: The first radio station 1 notifies the radio terminal 5 of the configuration information in the first cell 2 (that is, instruction to obtain and report measurement information). The first radio station 1 also notifies the radio terminal 5 of the measurement information in the second cell 4 (that is, instruction to obtain and report measurement information). Herein, these notifications may be performed to be multiplexed on the same message, and or performed by different messages.

Step S302: The radio terminal 5 obtains the measurement information (that is, first measurement information) in the first cell 2.

Step S303: The radio terminal 5 moves to the second cell 4. Movement herein means to change a cell for staying from the first cell 2 to the second cell 4, regardless of the fact whether the radio terminal 5 physically moves its own location. Herein, the radio terminal 5 executes the process to reuse the first configuration information when the second configuration information is partial (that is, information is not sufficient) in comparison with the first configuration information.

Step S304: Update of location registration is performed by movement of the radio terminal 5 from the first cell 2 to the second cell 4.

Step S305: In the second cell 4, the radio terminal 5 reports a log of the first measurement information obtained in the first cell 2 to the second radio station 3. The radio terminal 5 also reports to the second radio station 3, A) storing of the configuration information in the second cell, or B) the configuration information in the second cell. Herein, the radio terminal 5 may perform a report so as to identify a log of the first measurement information. For example, the radio terminal 5 adds into the head of a log of the first measurement information, information that indicates Radio Access Technology (RAT) corresponding to the log. Also, the radio terminal 5 adds into the end of a log of the first measurement information, information that indicates the first RAT, but the method for identifying a log is not limited to these methods. In addition, the radio terminal 5 may add to a log, information for identifying correspondence between RAT and measurement information, when obtaining measurement information.

Step S306: The second radio station 3 having received the report determines whether to utilize the radio terminal 5 for obtaining the second measurement information.

Step S307: Giving an instruction to obtain (and report) the second measurement information to the radio terminal 5 when utilizing the radio terminal 5 for obtaining such information. That is, the radio terminal 5 C) gives an instruction to continue obtaining the measurement information in the second cell, or "D) transmits the configuration information in the second cell".

Step S308: After having received an instruction from the second radio station 3, the radio terminal 5 obtains the second measurement information in the second cell 4.

Herein, a step of updating location registration and a step of reporting a log obtained in the first cell may be performed in reverse order, or performed concurrently or in parallel as a series of operations.

The foregoing steps allow to realize continual obtainment (acquisition) of measurement information even when the radio terminal moves between different radio access technologies (RATs). This makes it possible to understand radio wave environments in the area where the radio terminal moves between the cells of different RATs, or around the area, thereby enabling to realize coverage optimization or mobility optimization, which takes the cells of multiple RATs into consideration.

<Exemplary Embodiment 4>

A fourth exemplary embodiment of the present invention will be described.

Figure 11:
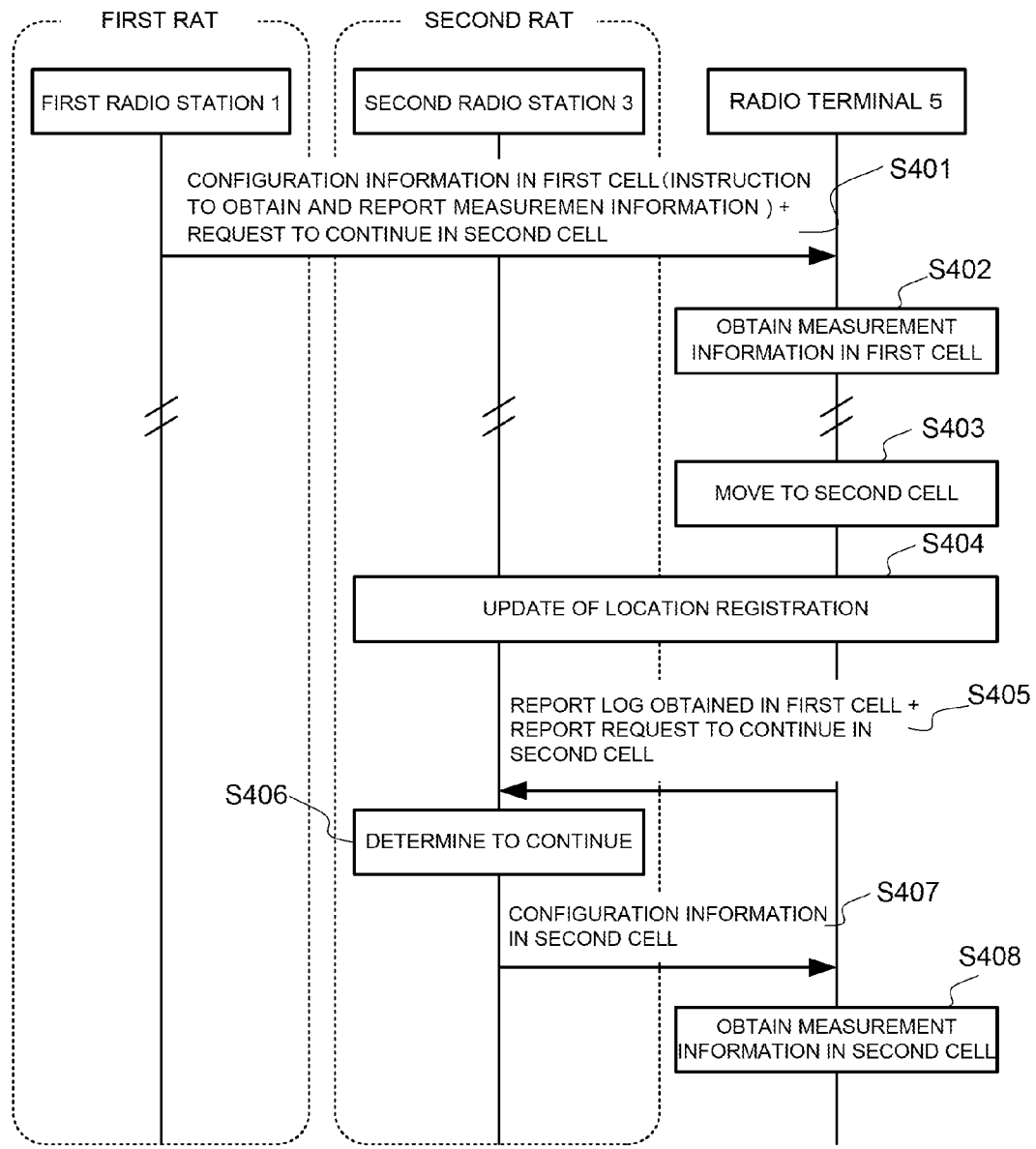
FIG. 11 is a sequence diagram illustrating operations of a radio station and a radio terminal in accordance with a fourth exemplary embodiment of the present invention.

FIG. 11 is a sequence diagram illustrating operations of a radio station and a radio terminal in accordance with a fourth exemplary embodiment of the present invention. In the fourth exemplary embodiment, the first radio station instructs the radio terminal, to obtain (that is, measurement and logging of the measurement results) and report the measurement information in the first cell (that is, first measurement information) and to report the first measurement information in the second cell, and the first radio station also requests the radio terminal to continue obtaining and reporting the measurement information (that is, second measurement information) in the second cell (that is, transmission of "a continuation request in the second cell"). The radio terminal reports to the second radio station, the first measurement information and the reception of a request to obtain (and report) the second measurement information from the first radio station when moving from the first cell to the second cell. The second radio station having received the report determines whether to let the radio terminal to obtain the second measurement information, and gives an instruction to obtain (and report) the second measurement information (that is, transmission of "configuration information in the second cell") when letting the radio terminal to obtain such information. The radio terminal obtains (and reports) the second measurement information in the second cell when receiving the instruction from the second radio station.

Step S401: The first radio station 1 notifies the radio terminal 5 of the configuration information in the first cell 2 (that is, instruction to obtain and report measurement information). The first radio station 1 also transmits a continuation request (that is, transmission of "a continuation request in the second cell") to obtain and report the measurement information in the second cell (that is, second measurement information). Herein, this notification and request may be performed to be multiplexed on the same message, and or performed by different messages.

Step S402: The radio terminal 5 obtains the measurement information in the first cell 2 (that is, first measurement information).

Step S403: The radio terminal 5 moves to the second cell 4. Movement herein means to change a cell for staying from the first cell 2 to the second cell 4, regardless of the fact whether the radio terminal 5 physically moves its own location.

Step S404: Update of location registration is performed by movement of the radio terminal 5 from the first cell 2 to the second cell 4.

Step S405: In the second cell 4, the radio terminal 5 reports to the second radio station 3, a log of the first measurement information obtained in the first cell 2 and the reception of a request to obtain (or obtain and report) the second measurement information (report a request to continue in the second cell) from the first radio station 1. Herein, the radio terminal 5 may perform a report so as to identify a log of the first measurement information. For example, the radio terminal 5 adds into the head of a log of the first measurement information, information that indicates Radio Access Technology (RAT) corresponding to the log. Also, for example, the radio terminal 5 adds into the end of a log of the first measurement information, information that indicates the first RAT, but the method for identifying a log is not limited to these methods. In addition, the radio terminal 5 may add to a log, information for identifying correspondence between RAT and measurement information, when obtaining measurement information.

Step S406: The second radio station 3 having received the report determines whether to let the radio terminal 5 to obtain the second measurement information.

Step 407: The second radio station 3 gives an instruction to obtain (and report) the second measurement information to the radio terminal 5 (transmission of configuration information in the second cell) when letting the radio terminal 5 to obtain such information. Herein, the radio terminal 5 executes the process to reuse the first configuration information when the second configuration information is partial (that is, information is not sufficient) compared with the first configuration information.

Step S408: After having received the instruction from the second radio station 3, the radio terminal 5 obtains the second measurement information in the second cell 4.

Herein, a step of updating location registration and a step of reporting a log obtained in the first cell may be performed in reverse order, or performed concurrently or in parallel as a series of operations.

The foregoing steps allow to realize continual obtainment (acquisition) of measurement information even when the radio terminal moves between different radio access technologies (RATs). This makes it possible to understand radio wave environments in the area where the radio terminal moves between the cells of different RATs, or around the area, thereby enabling to realize coverage optimization or mobility optimization, which takes the cells of multiple RATs into consideration.

<Second Embodiment>

Figure 12:
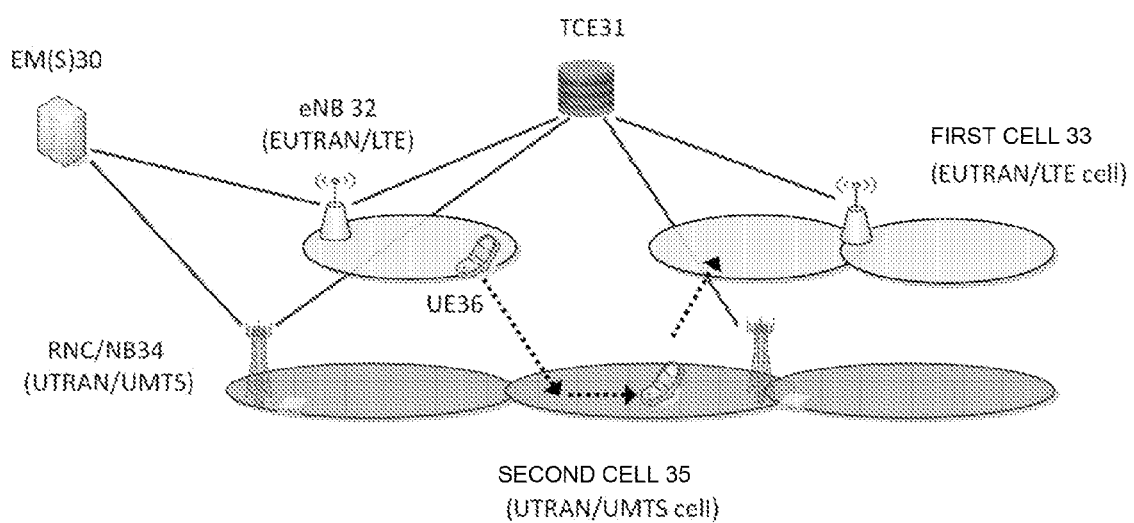
FIG. 12 is a diagram illustrating the configuration of a radio communication system in accordance with a second embodiment of the present invention.

A second embodiment of the present invention will be described with reference to FIG. 12. Herein, a system of 3GPP LTE (Long Term Evolution) and UMTS (Universal Mobile Telecommunication System) is assumed.

The radio communication system in the second embodiment includes a network operation management system (Element Manager: EM. It is also called Element Management System: EMS) 30, a trace information collection apparatus (Trace Collection Entity: TCE), a first radio base station 1 (evolved Node B: eNB) having a function of LTE of the first Radio Access Technology (RAT), a first cell (LTE cell) 33 provided by the first radio base station eNB, a second base station control station (Radio Network Controller: RNC)/radio base station (Node B: NB) 34 having a function of UMTS of the second Radio Access Technology, a second cell (UMTS cell) 35 provided by the second base station control station RNC/radio base station NB34, and a radio terminal (User Equipment: UE) 36 having the functions of both LTE and UMTS.

Note that the base station control station RNC and the base station NB have different nodes in reality, and the both RNC and NB are connected with each other by way of a predetermined interface, but the both are collectively described for the sake of simplicity. Although not shown in the figure, a LTE radio network is configured with a packet core network (Evolved Packet Core: EPC) including a network apparatus, such as a mobile management apparatus (Mobility Management Entity: MME) of the radio terminal UE and a serving gateway (Serving Gateway: S-GW). Similarly, a UTMS radio network is configured with a core network (Core Network: CN) including a network apparatus, such as a serving GPRS (General Packet Radio Service) support node (Serving GPRS Support Node: SGSN) and a mobile (communication) switching station (Mobile Switching Centre: MSC). In addition, a home subscribe management server (Home Subscriber Server: HSS) is provided as a network apparatus that is common between multiple RATs. Further, the present invention may be of course applied to the case when the first RAT is UMTS and the second RAT is LTE.

Further, a logged MDT that is one of drive-test minimization functions (Minimization of Drive Test: MDT) defined in 3GPP LTE and UMTS is assumed as a function of obtaining and reporting measurement information by the radio terminal UE36. In the Logged MDT, the radio terminal UE obtains measurement information (measurement, and logging of the measurement results) in any of a RRC (Radio Resource Control)_Idle state of LTE, a UMTS_Idle state of UMTS, a CELL_PCH (Paging CHannel) state and a URA (UTRAN Registration Area)_PCH state in accordance with configuration information (Logged Measurement Configuration) notified from a radio station (e.g. radio base station eNB of LTE or base station control station RNC/base station NB of UMTS). Herein, a thing in which what the measurement results are recorded is called a log. The log includes information that indicates logging time (or timing), etc.

On the other hand, for example, the followings are conceived as an item of measurement information in the Logged MDT.

In the case of LTE,

Received power (RS Received Power: RSRP) of a reference signal (Reference Signal: RS) of serving cells and neighboring cells;

Received quality (RS Received Quality: RSRQ) of a reference signal (RS) of serving cells and neighboring cells;

Reception failure information (Paging Channel Failure, Broadcast Channel Failure) of a common control signal (channel);

Transmission failure information of a random access signal (Random Access Failure);

Radio link failure RLF (Radio Link Failure) information; and

Location Information.

Herein, location information includes detailed information obtained with GNSS typified by GPS, and detailed location information obtained with a network based location information obtainment (acquisition) service (Location Service: LCS) such as OTDOA. Physical cell IDs (Physical Cell Identity: PCI) in multiple neighboring cells on the same frequency, and received power (RSRP) of a reference signal of the neighboring cells are logged as location information, when failing to obtain (or when not storing) the detailed location information. This is also called RF (Radio Frequency) fingerprint.

Similarly, in the case of LTE,

Received power (Received Signal Code Power: RSCP) of a pilot signal (Common Pilot Channel: CPICH) in serving cells and neighboring cells;

Received quality (Ratio of energy per modulating bit to the noise spectral density: Ec/No) of a pilot signal (CPICH) in serving cells and neighboring cells;

Reception failure information of a common control signal (channel) (Paging Channel Failure, Broadcast Channel Failure);

Transmission failure information of a random access signal (Random Access Failure);

Radio link failure RLF (Radio Link Failure) information; and

Location Information.

Herein, location information includes detailed information obtained with GNSS or LCS, which is the same as in LTE. Physical cell IDs (Primary Synchronization Code: PSC) in multiple neighboring cells having the same frequency, and received power (RSCP) of a pilot signal in the neighboring cells are logged as location information, when failing to obtain (when not storing) the detailed location information.

For example, the configuration information for the logged MDT (Logged Measurement Configuration) includes the following information:

Absolute time that is a basis to start logging measurement information (e.g. measurement results) (Absolute Time Info);

Recording duration of measurement information (e.g. measurement results) (Logging Duration);

Recording interval of measurement information (e.g. measurement results) (Logging Interval); and Target area for logging measurement information (e.g. measurement results) (Area Configuration)

Trace related information (Trace Information).

Herein, a logging target area is indicated by a global cell ID (EUTRAN Cell Global Identity: ECGI) or a tracking area (Tracking Area: TA) in the case of LTE, and by a global cell ID (Cell Global Identity: CGI), a routing area (Routing Area: RA), or a location area (Location Area: LA) in the case of UMTS. When the logging target area (Area Configuration) is not included in the configuration information, logging is performed while staying in a public land mobile network (Public Land Mobile Network: PLMN) at the time of receiving the configuration information.

In addition, logging may be performed while staying in any PLMN equivalent to the above-mentioned PLMN (equivalent PLMN: ePLMN). Also, the trace related information is the information for managing on the network side the execution of the MDT in which the radio terminal UE obtains and reports measurement information, and in the Logged MDT, it is reported to the radio network together when the radio terminal UE reports a log. More specifically, the trace related information includes a predetermined identifier (Trace Reference ID) for identifying when the radio network instructs the MDT and by which the radio terminal UE, or information on the TCE collecting a log reported from the radio terminal UE (TCE IP Address or TCE ID), or the like.

On the other hand, for example, the following two methods are conceived as a request, which is made from the radio base station eNB32 of the first RAT (LTE) to the radio terminal UE36, for reporting the measurement information (log which logs the measurements results) obtained in the first cell (LTE cell), after the radio base station eNB32 of the first RAT (LTE) moves (e.g. Cell Reselection or Handover) from the first cell (LTE cell) 33 of the first RAT (LTE) to the second cell (UMTS cell) 35 of the second RAT (UMTS).

1) Notifying a message that includes information (e.g. flag and the like) for instructing to report, in the second cell (UMTS cell), the measurement information (that is, log) obtained in the first cell (LTE cell).

2) Notifying a message that includes the second configuration information for Logged MDT in the second cell (UMTS cell).

3) Notifying a message that includes information for instructing continuation of the Logged MDT in the second cell (UMTS cell).

The radio terminal UE needs to recognize in advance (e.g. defined in the specification) that these notifications also request reporting of the first measurement information in the second cell, when using the method 2) or 3).

Next, the following two methods are conceived as a request, which is made by the radio base station eNB32 of the first RAT (LTE), for obtaining (or obtaining and reporting) the measurement information (second measurement information) by the Logged MDT in the second cell (UMTS cell) 35, after the radio terminal UE36 moves from the first cell (LTE cell) 33 to the second cell (UMTS cell) 35.

a) Notifying a message that includes the second configuration information of Logged MDT in the second cell (UMTS cell).

b) Notifying a message that includes information for instructing continuation of the Logged MDT in the second cell (UMTS cell).

Herein, the above method 2) or the method 3) is related to the method a) or the method b) respectively. That is, when notified of a message including the second configuration information of Logged MDT in the case of using the method 1), the message has a meaning of the method a), and in the case of using the method 2), the message has a meaning of either only the method 2), or the both method 2) and method a). Much the same is true on the method 3) and method b).

Continuation of the Logged MDT may be to continue both obtaining measurement information by the Logged MDT (e.g. logging of the measurement results, that is, log generation) and reporting the measurement information (that is, log), or continue only obtaining measurement information. In the latter case, the radio terminal UE reports the obtained measurement information (log) after moving to the first RAT (LTE) cell again (that is, returning to the first RAT (LTE) cell).

Also, when the radio terminal UE receives in the first cell (LTE cell), the second configuration information of Logged MDT for obtaining (and reporting) measurement information in the second cell (UMTS cell) and is given a request to obtain (and report) measurement information in the second cell (UMTS cell), it is conceived to report the request in the second cell (UMTS cell) by the following two methods.

A) Reporting of a message including information that indicates storing the configuration information for the Logged MDT in the second cell (UMTS cell).

B) Reporting of a message that includes the stored (e.g., having received in the first cell (LTE cell)) configuration information for the Logged MDT in the second cell (UMTS cell)

Further, for example, in the case that the radio base station eNB32 lets the radio terminal UE36 to obtain (and report) measurement information by the Logged MDT in the second cell (UMTS cell) 35 when receiving a report of the above A) or B) from the radio terminal UE36, it is conceived to give an instruction by the following two methods.

C) Notification of a message that includes an instruction to continue obtaining measurement information by the Logged MDT in the second cell (UMTS cell) 35.

D) Notification of a message that includes configuration information for the Logged MDT in the second cell (UMTS cell) 35.

Herein, the above method A) and method B) may be made to correspond to the method C) and method D) respectively, or the method A) and the method D), the method B) and the method C) or the like, any combination is also possible.

The configuration information for the Logged MDT in the second cell (that is, second configuration information) by the method B) or the method D) may include items (or information) similar to those of the first configuration information, or may be partial information corresponding to only some of the items (or information) included in the first configuration information. When missing an amount of information in comparison with the first configuration information (that is, partial information of the first configuration information), as for the missing items in the second configuration information (e.g. missing items in comparison with the first configuration information), the radio terminal reuses the items in the first configuration information. Herein, it is conceived that reuse refers to the processes such as:

Taking over (or, using) absolute time, a logging duration, a logging interval, trace related information and the like as they are; and Continuing values such as a timer and a counter that measure a logging duration, a logging interval and the like; but the present invention is not limited to these processes.

In the Logged MDT of 3GPP, items of measurement information (that is, measurement items) to be a target are defined in the specification per RAT (LTE is RSRP and RSRQ, UMTS is RSCP and Ec/No). Then, the radio terminal UE also changes items of the measurement information (that is, measurement items) when changing RAT by moving between the cells of different RATs (e.g. cell reselection or handover).

Herein, start of the Logged MDT (that is, start of obtaining a log) after moving to a cell of different RAT may be performed after recognizing (detecting) that a destination cell is a target area of the Logged MDT, or before recognizing (detecting). As for making a determination whether the cell is a target area of the Logged MDT, for example, the method is conceived to receive system information that is broadcasted in a destination cell, and determine whether the cell is a target PLMN of the Logged MDT. Similarly, it may be determined by a global ID or TA in the case of LTE, and by a global cell ID, RA or LA in the case of UMTS.

On the other hand, when the radio terminal UE may perform a report so as to differentiate a log in the first RAT (LTE) cell from a log in the second RAT (UMTS) when obtaining a log in a cell of different RAT. For example, the following methods are conceived.

Method for adding information that indicates the RAT (e.g. flag or identifier) when obtaining a first log in each RAT, in a series of the Logged MDT execution instructed from a radio network at some point in time;

Method for adding information that indicates the first RAT when reporting a log obtained in the first RAT, in the second RAT that is a destination, when moving from the first RAT that receives an instruction to execute the Logged MDT to the second RAT (further, repeating at every RAT changing);

Method for defining different information elements per RAT (FIG. 13 shows an example of the format in the case of reporting in a LTE cell); and Method for preparing different memory per RAT, and adding information that indicates RAT to a log stored in each memory.

Also, addition of information indicating RAT may be executed at the time of performing a report, instead of obtaining a log.

In the above-descriptions of the second embodiment of the present invention, the first RAT is LTE and the second RT is UMTS, but the present invention may be of course applied to the case when the first RAT is UMTS and the second RAT is LTE.

The further exemplary embodiment of the present invention based on the assumption of the second embodiment will be described.

<Exemplary Embodiment 5>

A fifth exemplary embodiment of the present invention will be described.

Figure 14:
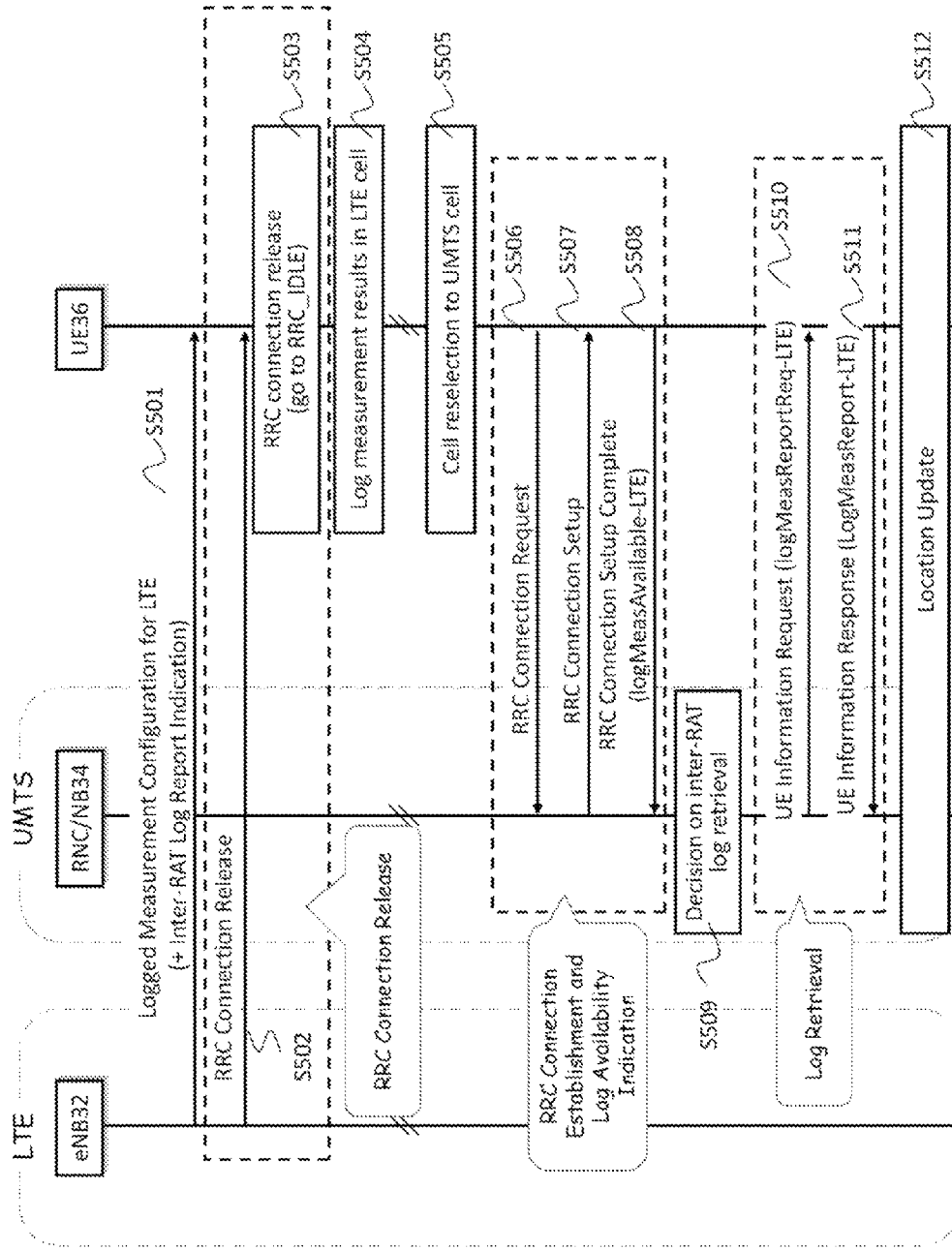
FIG. 14 is a sequence diagram illustrating operations of a radio station and a radio terminal in accordance with a fifth exemplary embodiment of the present invention.

FIG. 14 is a sequence diagram illustrating operations of a radio station and a radio terminal in accordance with a fifth exemplary embodiment of the present invention. In FIG. 14, assuming a radio base station eNB32 of LTE as a first radio station of the first Radio Access Technology (RAT) and a base station control station RNC/base station NB of UMTS as a second radio station of the second Radio Access Technology (RAT), and that the radio terminal UE stays in a LTE cell in a RRC_Connected state (that is, belonging to the radio base station eNB managing the cell). In the fifth exemplary embodiment, the radio base station eNB of LTE instructs the radio terminal UE to execute the Logged MDT in the LTE cell of the first cell, that is, to obtain the first measurement information (that is, measurement, and logging of the measurement results) and report a generated log, and to report the first measurement information for the UMTS cell of the second cell, that is, a log generated in the LTE cell.

Step S501: The radio base station eNB32 transmits to the radio terminal UE36, the Logged MDT configuration information that is the first configuration information as an instruction to execute the Logged MDT in the LTE cell (Logged Measurement Configuration for LTE). The radio base station eNB32 also instructs the radio terminal UE36 to report a log generated in the LTE cell 33 after the radio terminal UE36 moves to the UMTS cell 35 (Inter-RAT Log Report Indication). Herein, the latter instruction may be omitted when the consensus is built in advance between radio base station eNB and the radio terminal UE, or the instruction is defined in advance in the specification.

Step S502: The radio base station eNB instructs the radio terminal UE to make a transition to an idle state (RRC idle) at a predetermined timing (RRC Connection Release).

Step S503: The radio terminal UE36 releases a RRC connection and goes to an idle state (RRC Connection Release ((go to RRC_IDLE)).

Step S504: The radio terminal UE36 obtains the measurement information in the LTE cell 33 (Log measurement results in LTE cell).

Step S505: The radio terminal UE36 executes a cell reselection from the LTE cell 33 to the UMTS cell 35 when the predetermined trigger for the cell reselection is happened (Cell reselection to UMTS cell).

Step S506: The radio terminal UE36 requests the base station control station RNC/base station NB34 to establish a RRC connection (RRC Connection Request).

Step S507: The base station control station RNC/base station NB34 notifies the radio terminal UE36 of control information for establishing a RRC connection (RRC Connection Setup).

Step S508: The radio terminal UE36 performs a report to the base station control station RNC/base station NB34, necessary configurations for establishing a RRC connection are completed according to the control information (RRC Connection Setup Complete). At this time, it is reported to store a log (log is available) generated in the LTE cell (logMeasAvailable-LTE).

Step S509: The base station control station RNC/base station NB34 determines whether to let the radio terminal UE36 to report a log generated in the LTE cell 33 based on a report of storing the log (Decision on inter-RAT log retrieval). Note that, the case for letting the radio terminal UE36 to report a log is shown in FIG. 14. Herein, different information used for determining whether to let the radio terminal UE36 to report a log or not is conceived, such as terminal capability information of the radio terminal UE and whether to receive (or, have received) an instruction to execute the Logged MDT over the different RATs from an upper network (e.g. EM(S) or CN).

Step S510: The base station control station RNC/base station NB34 requests the radio terminal UE36 to report the log generated in the LTE cell 33 (UE Information Request (logMeasReportReq-LTE)).

Step S511: The radio terminal UE36 reports the log in response to a log request (UE Information Response (LogMeasReport-LTE)).

Step S512: The radio terminal UE36 transmits and receives necessary information with a core network CN (e.g. home subscriber server HSS) to update location registration (Location Update). Note that, transmission and reception of information necessary for updating location registration may be performed before a log report, or concurrently with a log report.

The foregoing steps allow to realize continual obtainment (acquisition) of measurement information even when the radio terminal UE36 moves between different radio access technologies (RATs). This makes it possible to understand radio wave environments in the area where the radio terminal moves between the cells of different RATs, or around the area, thereby enabling to realize coverage optimization or mobility optimization, which takes the cells of multiple RATs into consideration.

Figure 15:
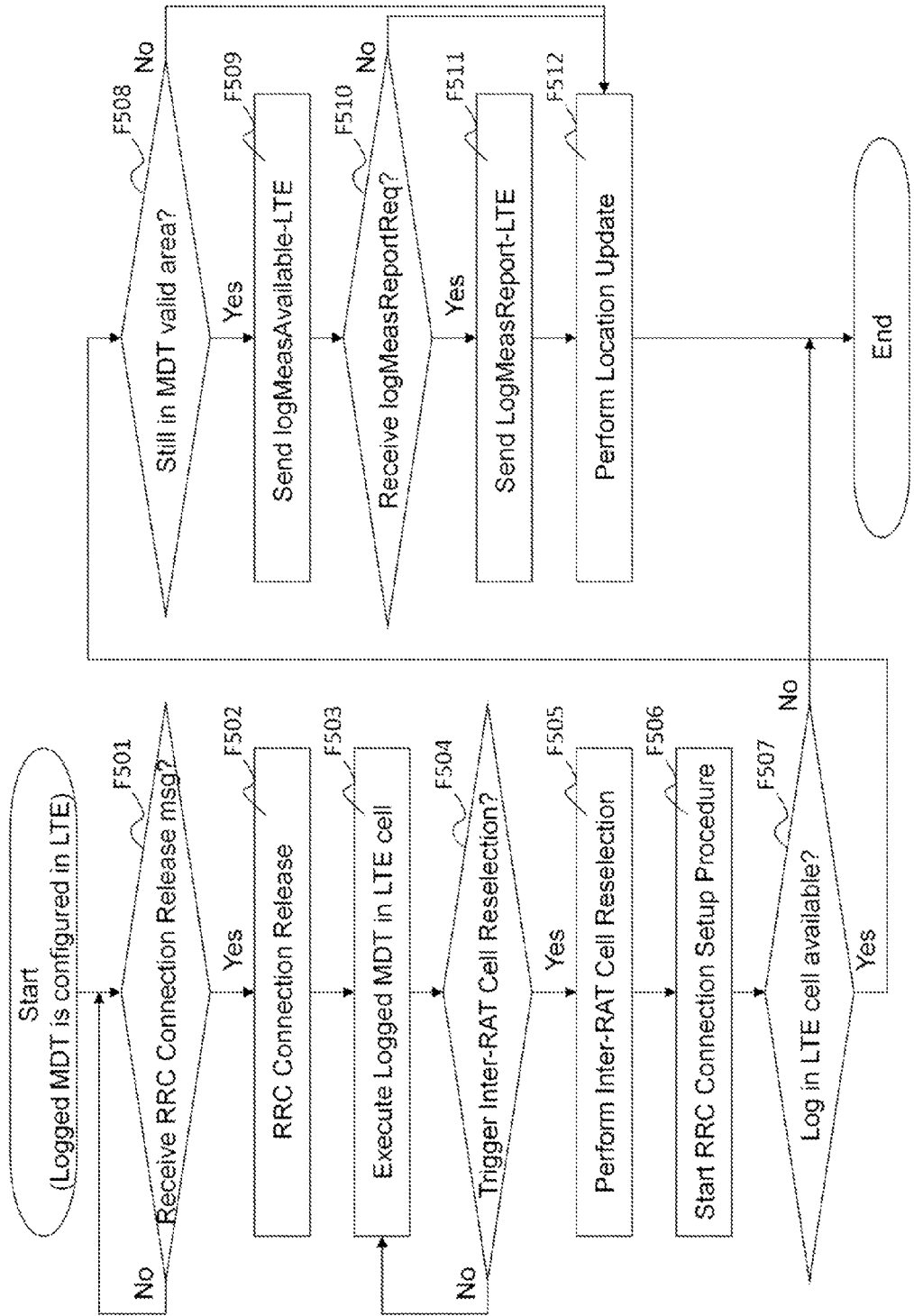
FIG. 15 is a flowchart illustrating operations of the radio terminal UE in accordance with a fifth exemplary embodiment of the present invention.

FIG. 15 is a flowchart illustrating an operation of the radio terminal UE in accordance with a fifth exemplary embodiment of the present invention. Herein, as an initial state, it is assumed that the radio terminal UE stays in the LTE cell in a RRC_Connected state (that is, serving cell is the LTE cell).

The radio terminal UE36 determines whether to have received an instruction for a RRC connection release from the radio base station eNB32 (F501: Receive RRC Connection Release msg?). When having received an instruction for a RRC connection release (F501 Yes), the radio terminal UE36 releases a RRC connection (F502: RRC Connection Release) to execute the Logged MDT in the LTE cell33 (F503: Execute Logged MDT in LTE cell). The radio terminal UE36 determines whether to need to reselect a cell at a predetermined timing (F540: Trigger Inter-RAT Cell Reselection?), and when not necessary (F504 No), the radio terminal UE36 continues the Logged MDT. When necessary to reselect a cell (F504 Yes), radio terminal UE36 performs to reselect a cell (F505: Perform Inter-RAT Cell Reselection).

The radio terminal UE36 requests the base station control station RNC/base station NB34 to establish a RRC connection (RRC Connection Request), and the base station control station RNC/base station NB34 notifies the radio terminal UE36 of control information for establishing a RRC connection (RRC Connection Setup). Then, the radio terminal UE36 performs a report to the base station control station RNC/base station NB34, necessary configurations for establishing a RRC connection are completed according to the control information (RRC Connection Setup Complete) (F506: Start RRC Connection Setup Procedure).

At this time, the radio terminal UE36 determines whether storing a log (or, log is available) generated in the LTE cell (F506: Log in LIE cell available?). When not storing a log (or, not available), it is terminated (F506 No).

On the other hand, when storing a log (or, log is available) generated in the LTE cell (F506 Yes), the radio terminal UE36 determines whether a new cell is a target area of the Logged MDT (F508: Still in MDT valid area?), and when not a target area (F508 No), the radio terminal UE36 transmits and receives necessary information with a core network CN (e.g. home subscriber server HSS) to update location registration (F512: Location Update).

Also, when storing a log (or, log is available) generated in the LTE cell and a new cell is a target area of the Logged MDT (F508 Yes), the radio terminal UE36 reports storing of a log (or, availability of a log) generated in the LTE (F509: send logMeasAvailable-LTE).

The radio terminal UE36 determines whether to have received a request for a log report (F510: Receive logMeasReportReq?).

When having received a request for a log report (F510 Yes), the radio terminal UE36 reports a log (F511: Send LogMeasReport-LTE). Then, the process goes to F512.

<Modification of Exemplary Embodiment 5>

In the fifth exemplary embodiment shown in FIG. 14, the radio base station of LTE, which is the first RAT, gives an instruction (Inter-RAT Log Report Indication) to the radio terminal UE to report a log generated in the LTE cell (or, defined in advance in the specification) after the radio terminal UE moves to the UMTS cell, but an instruction may be given by other messages such as a) Notification of a message that includes configuration information for the Logged MDT in the UMTS (Logged Measurement Configuration for UMTS); and b) Notification of a message that includes a request to continue the Logged MDT in the UMTS (Logging Continuation Request for UMTS).

<Exemplary Embodiment 6>

A sixth embodiment of the present invention will be described.

FIG. 15 is a sequence diagram illustrating operations of a radio station and a radio terminal in accordance with a sixth exemplary embodiment of the present invention. The initial state is the same as that of the fifth exemplary embodiment. The difference from the fifth exemplary embodiment lies in that, in the sixth exemplary embodiment, the radio base station eNB32 of LTE requests the radio terminal UE36 to execute the Logged MDT after the radio terminal UE36 moves to the UMTS cell, in addition to an instruction of the Logged MDT in the LTE cell and an instruction to report a log in the UMTS cell when the radio terminal UE36 moves to the UMTS cell while storing the log generated in the LTE cell.

Step S601: The radio base station eNB32 transmits to the radio terminal UE36, the Logged MDT configuration information that is the first configuration information as an instruction to execute the Logged MDT in the LTE cell (Logged Measurement Configuration for LTE). The radio base station eNB32 also transmits the Logged MDT configuration information that is the second configuration information as a request to execute the Logged MDT in the UMTS cell (Logged Measurement Configuration for UMTS). In the latter transmission of the Logged MDT configuration information of different RAT (e.g. UMTS herein), when the radio terminal UE36 moves to a cell of different RAT, that is, the UMTS cell while storing a log generated in a cell of initial RAT, that is, in the LTE cell, it can be an instruction to report a log of the LTE cell in the UMTS cell.

Step S602: The radio base station eNB32 instructs the radio terminal UE36 to make a transition to an idle state (RRC idle) at a predetermined timing, and the radio terminal UE36 releases a RRC connection and goes to an idle state (RRC Connection Release).

Step S603: The radio terminal UE36 obtains the measurement information by the Logged MDT in the LTE cell (Log measurement results in LTE cell).

Step S604: The radio terminal UE36 executes a cell reselection from the LTE cell to the UMTS cell when the predetermined trigger for the cell reselection is happened (Cell reselection to UMTS cell).

Step S605: The radio terminal UE36 and the radio base station eNB32 establishes a RRC connection (RRC Connection Establishment), and the radio terminal UE36 reports storing of a log (or, availability of a log) generated in the LTE cell (Log Availability Indication).

Step S606: The base station control station RNC/base station NB32 determines whether to let the radio terminal UE to report a log generated in the LTE cell based on a report of storing the log (Decision on inter-RAT log retrieval). Note that, the case for letting the radio terminal UE36 to report a log is shown in FIG. 15. Herein, different information used for determining whether to let the radio terminal UE36 to report a log or not is conceived, such as terminal capability information of the radio terminal UE and whether to receive (or, have received) an instruction to execute the Logged MDT across the different RATs from an upper network (e.g. EM(S) or CN).

Step S607: The base station control station RNC/base station NB32 collects the log generated in the LTE cell from the radio terminal UE36 (Log Retrieval), and updates location registration (Location Update).

Step S608: The radio terminal UE36 performs a report to the base station control station RNC/the base station NB34 of UMTS by using any of the following two methods, having received a request to execute the Logged MDT in the UMS cell from the radio base station eNB32 of LTE.

A) Transmission of a message that includes a notification of having received a request to continue the Logged MDT in the UMTS cell (Indication of Reception of Logging Continuation Request for UMTS); and B) Transmission of a message that includes information related to the Logged MDT configuration information in the UMTS cell (Information on Received Logged Measurement Configuration for UMTS).

Step 609: The base station control station RNC/the base station NB34 determines whether to continue the Logged MDT in the UMTS cell (Decision on Logged MDT configuration). Herein, it is conceived that making a determination whether to continue the Logged MDT is performed, for example, based on whether to receive (or, have received) an instruction to execute the Logged MDT over the different RATs from an upper network (e.g. EM(S) or CN), whether to receive (or, have received) an instruction to execute the Logged MDT in the RAT cell (that is, UNTS cell), or the like. Note that, the case for letting the radio terminal UE36 to perform a report is shown in FIG. 15.

Step S610: The base station control station RNC/the base station NB34 instructs the radio terminal UE to execute (or, continue) the Logged MDT in the UMTS cell by using any of the following two methods.

C) Notification of a message that includes an instruction (e.g. flag) to continue the Logged MDT in the UMTS cell (Indication of Logging Continuation in UMTS); and D) Notification of a message that includes the Logged MDT configuration information for the UMTS cell (Logged Measurement Configuration for UMTS).

Herein, the Logged MDT configuration information of the method D) may be the same as, or different from the one notified from the radio terminal UE. In addition, it may be partial of the original Logged MDT configuration information, that is, simplified Logged MDT configuration information.

Step S611: The base station control station RNC/the base station NB34 instructs the radio terminal UE36 to change to an idle state (UMTS Idle) at a predetermined timing, and the radio terminal UE36 releases a RRC connection and goes to an idle state (RRC Connection Release).

Step S612: The radio terminal UE36 obtains measurement information by the Logged MDT in the UMTS cell (Log measurement results in UMTS cell).

Although not shown in FIG. 15, in the case of UMTS, the radio terminal UE36 obtains measurement information by the Logged MDT even in, for example, a standby state (CELL_PCH, URA_PCH) except for an idle state. Also, a step of the log report and a step of update of location registration are collectively described as a series of operations, but these steps may be performed separately irrespective of the order. Further, steps of the log report and update of location registration and a step of reporting the reception of a request to execute the Logged MDT in the UMTS cell are separately described in the above-order, but these steps may be performed as a series of operations, or the orders may be partially reversed.

The foregoing steps allow to realize continual obtainment (acquisition) of measurement information even when the radio terminal UE moves between different radio access technologies (RATs). This makes it possible to understand radio wave environments in the area where the radio terminal moves between the cells of different RATs, or around the area, thereby enabling to realize coverage optimization or mobility optimization, which takes the cells of multiple RATs into consideration.

29

<Exemplary Embodiment 7>

A seventh embodiment of the present invention will be described.

Figure 17:
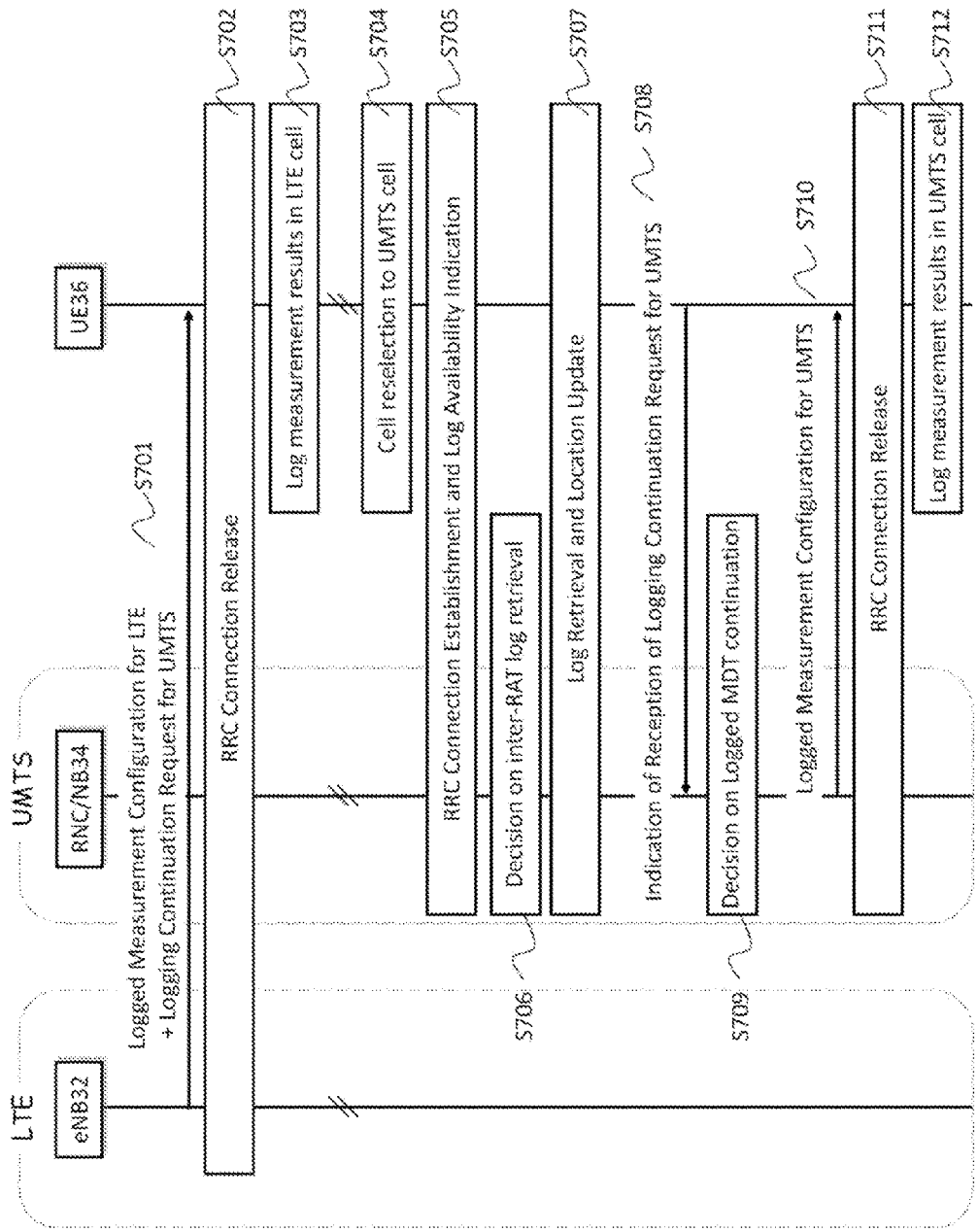
FIG. 17 is a sequence diagram illustrating operations of a radio station and a radio terminal in accordance with a seventh exemplary embodiment of the present invention.

FIG. 17 is a sequence diagram illustrating operations of a radio station and a radio terminal in accordance with a seventh exemplary embodiment of the present invention. The initial state is the same as that of the fifth exemplary embodiment. In the seventh exemplary embodiment, as is the case with the sixth exemplary embodiment, the radio base station eNB requests the radio terminal UE to execute the Logged MDT after the radio terminal UE36 moves to the UMTS cell, in addition to an instruction of the Logged MDT in the LTE cell and an instruction to report a log generated in the LTE cell after the radio terminal UE36 moves to the UMTS cell. The difference from the sixth exemplary embodiment lies in a method for requesting to execute the Logged MDT in the UMTS cell.

Step S701: The radio base station eNB transmits to the radio terminal UE, the Logged MDT configuration information that is the first configuration information as an instruction to execute the Logged MDT in the LTE cell (Logged Measurement Configuration for LTE). The radio base station eNB also transmits a request message to continue (or, execute) the Logged MDT in the UMTS cell (Logging Continuation Request for UMTS). In the latter transmission of the Logged MDT configuration information for different RAT (e.g. UMTS herein), when the radio terminal UE moves to a cell of different RAT, that is, the UMTS cell while storing a log generated in a cell of initial RAT, that is, in the LTE cell, it can be an instruction to report a log of the LTE cell in the UMTS cell.

Step S702: The radio base station eNB32 instructs the radio terminal UE36 to go to an idle state (RRC idle) at a predetermined timing, and the radio terminal UE36 releases a RRC connection and goes to an idle state (RRC Connection Release).

Step S703: The radio terminal UE36 obtains the measurement information by the Logged MDT in the LTE cell (Log measurement results in LTE cell).

Step S704: The radio terminal UE36 executes a cell reselection from the LTE cell to the UMTS cell when a predetermined trigger for the cell reselection is happened (Cell reselection to UMTS cell).

Step S705: The radio terminal UE36 and the radio base station eNB32 establishes a RRC connection (RRC Connection Establishment), and the radio terminal UE36 reports storing of a log (or, availability of a log) generated in the LTE cell (Log Availability Indication).

Figure 16:
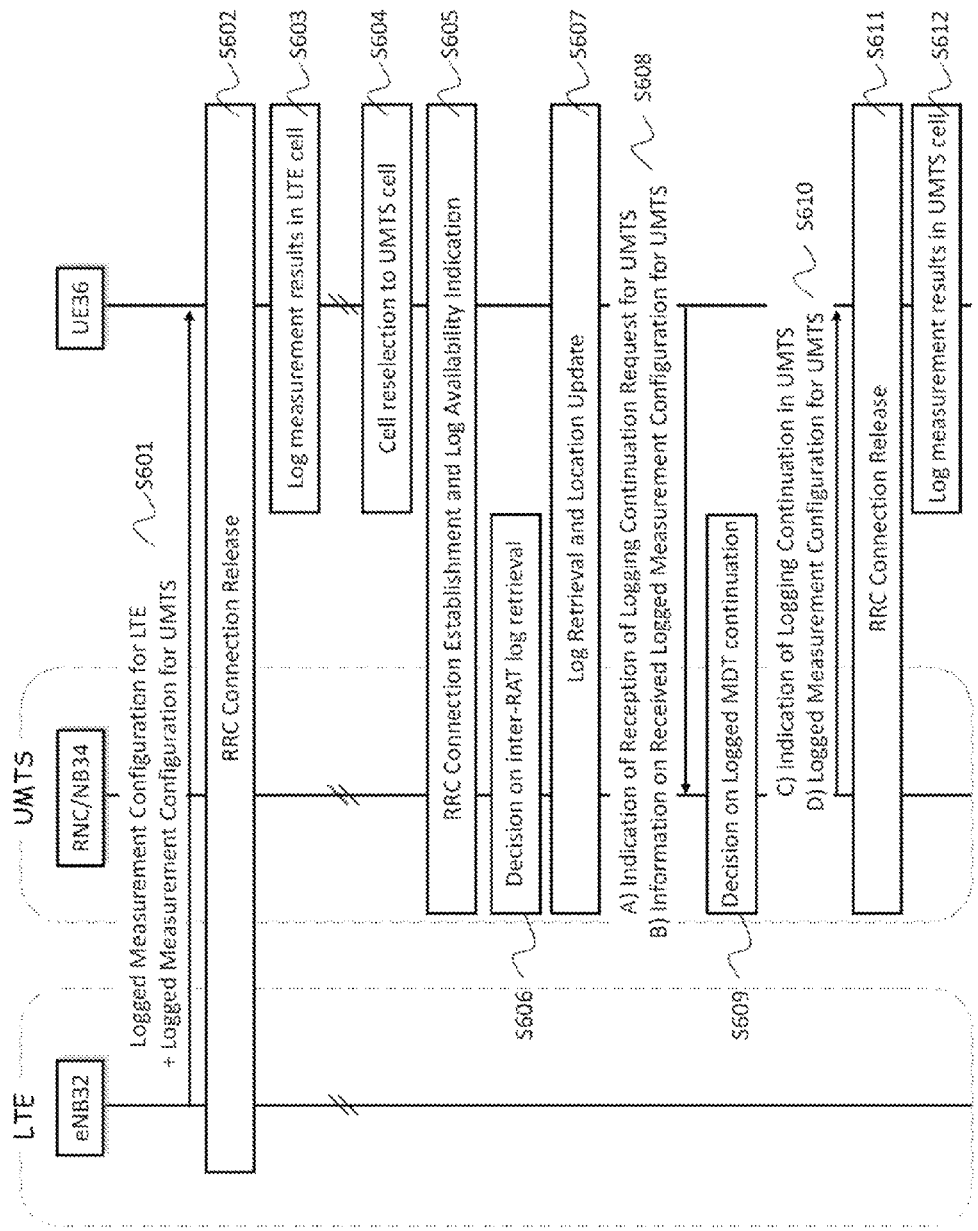
FIG. 16 is a sequence diagram illustrating operations of a radio station and a radio terminal in accordance with a sixth exemplary embodiment of the present invention.

Step S706: The base station control station RNC/base station NB34 determines whether to let the radio terminal UE36 to report a log generated in the LTE cell based on a report of storing the log (Decision on inter-RAT log retrieval). Note that, the case for letting the radio terminal UE36 to report a log is shown in FIG. 16. Herein, different information used for determining whether to let the radio terminal UE36 to report a log or not is conceived, such as terminal capability information of the radio terminal UE and whether to receive (or, have received) an instruction to execute the Logged MDT over the different RATs from an upper network (e.g. EM(S) or CN).

Step S707: The base station control station RNC/base station NB34 collects the log generated in the LTE cell from the radio terminal UE36 (Log Retrieval), and updates location registration (Location Update).

Step S708: The radio terminal UE36 performs a report to the base station control station RNC/the base station NB34 of UMTS, having received a request to continue (or,

30 execute) the Logged MDT in the UMS cell from the radio base station eNB32 of LTE (Indication of Reception of Logging Continuation Request for UMTS).

Step 709: The base station control station RNC/the base station NB34 determines whether to continue the Logged MDT in the UMTS cell (Decision on Logged MDT configuration). Herein, it is conceived that making a determination whether to continue the Logged MDT is performed, for example, based on whether to receive (or, have received) an instruction to execute the Logged MDT across the different RATs from an upper network (e.g. EM(S) or CN), whether to receive (or, have received) an instruction to execute the Logged MDT in the RAT cell (that is, UNTS cell), or the like. Note that, the case for letting the radio terminal UE36 to perform a report is shown in FIG. 17.

Step S710: The base station control station RNC/the base station NB34 notifies the radio terminal UE36 of a message including the Logged MDT configuration information in the UMTS cell (Logged Measurement Configuration for UMTS) to give an instruction to execute the Logged MDT in the UMTS.

Step S711: The base station control station RNC/the base station NB32 instructs the radio terminal UE36 to go to an idle state (UMTS Idle) at a predetermined timing, and the radio terminal UE36 releases a RRC connection and goes to an idle state (RRC Connection Release).

Step S712: The radio terminal UE36 obtains measurement information by the Logged MDT in the UMTS cell (Log measurement results in UMTS cell).

Although not shown in FIG. 17, in the case of UMTS, the radio terminal UE36 obtains measurement information by the Logged MDT even in a standby state except for an idle state (CELL_PCH, URA_PCH). Also, a step of the log report and a step of update of location registration are collectively described as a series of operations, but these steps may be performed separately irrespective of the order. Further, steps of the log report and update of location registration and a step of reporting the reception of a request to continue (or, execute) the Logged MDT in the UMTS cell are separately described in the above-order, but these steps may be performed as a series of operations, or the orders may be partially reversed.

The foregoing steps allow to realize continual obtainment (acquisition) of measurement information even when the radio terminal UE moves between different radio access technologies (RATs). This makes it possible to understand radio wave environments in the area where the radio terminal moves between the cells of different RATs, or around the area, thereby enabling to realize coverage optimization or mobility optimization, which takes the cells of multiple RATs into consideration.

<Exemplary Embodiment 8>

An eighth exemplary embodiment of the present invention will be described.

Figure 18:
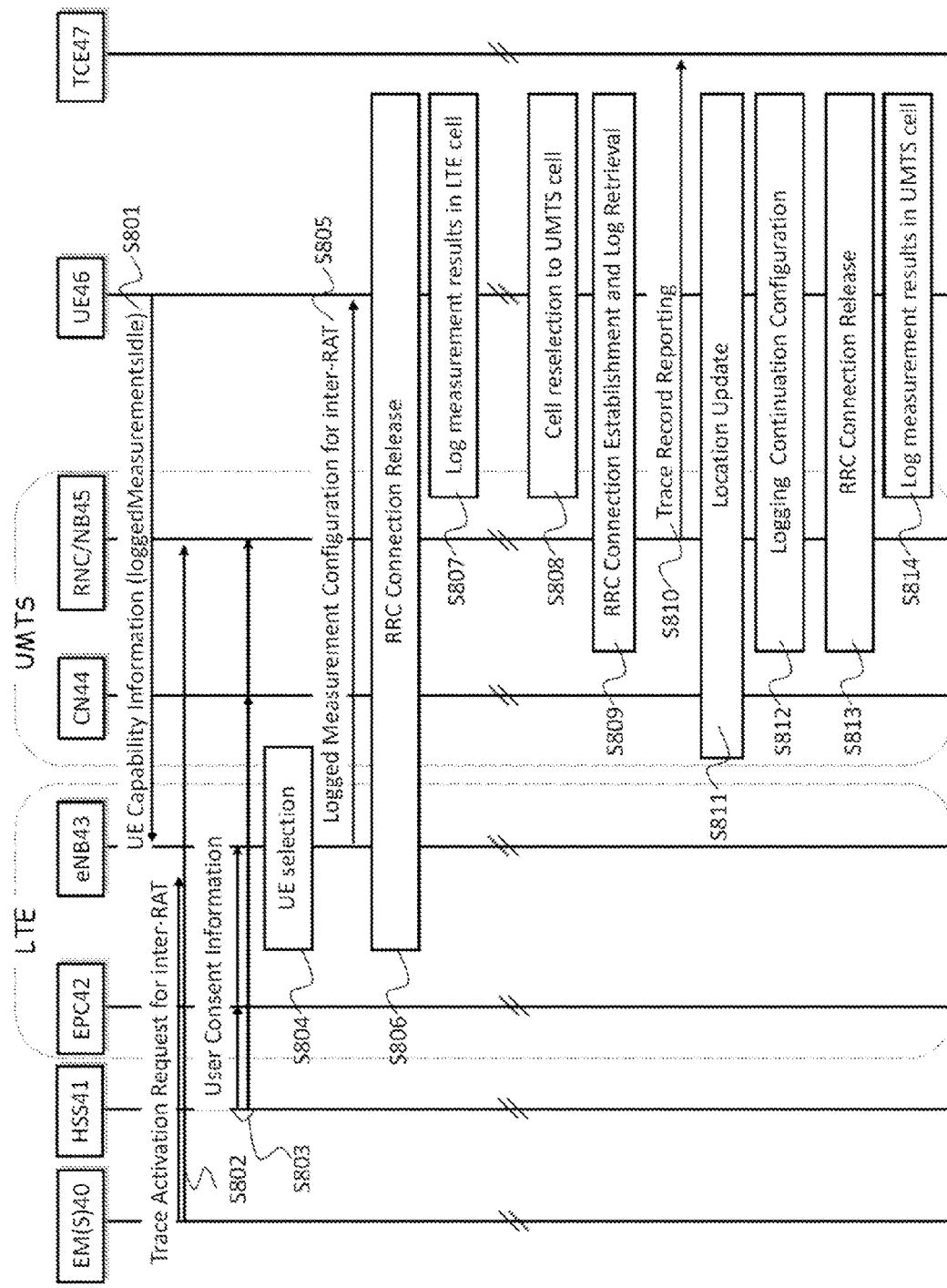
FIG. 18 is a sequence diagram illustrating operations of a radio network and a radio terminal in accordance with an eighth exemplary embodiment of the present invention.

FIG. 18 is a sequence diagram illustrating operations of a radio network and a radio terminal in accordance with an eighth exemplary embodiment of the present invention. FIG. 18 assumes a radio communication system that includes a network operation management apparatus EM(S)50, a home subscriber management server HSS51, a packet core network EPCS2 of LTE that is the first Radio Access Technology (RAT), a radio base station eNB53, a core network CN54 of UMTS that is the second RAT, a base station control station RNC/base station NB55, a radio terminal UE56, and a trace information collecting apparatus TCE57. The MDT method uses Logged MDT of the management based method (also called area based method). In the eighth exemplary embodiment, as is the case with the sixth and seventh exemplary embodiments, the radio base station eNB of LTE requests the radio terminal UE to execute the Logged MDT after the radio terminal UE36 moves to the UMTS cell, in addition to an instruction of the Logged MDT in the LTE cell and an instruction to report the log in the UMTS cell when the radio terminal UE36 moves to the UMTS cell while storing the log generated in the LTE cell. Note that, the present invention may be of course applied to the case when performing the method similar to that of the fifth exemplary embodiment, in addition to the sixth and seventh exemplary embodiments.

Step S801: The radio terminal UE46 notifies the radio base station eNB43 of support of the logged MDT (logged-MeasurementsIdle) by terminal capability information (UE Capability Information) related to radio access of the radio terminal UE46. Herein, the terminal capability information may newly define information (e.g., loggedMeasurementsIdle-InterRAT) that indicates having (or whether to have) capability to execute the Logged MDT over the cells of different RATs (that is, to execute the continual Logged MDT after changing the RAT).

Step S802: The network operation management apparatus EM(S)40 requests the radio base station eNB43 of LTE and the base station control station RNC/base station NB44 of UMTS to start to collect terminal measurement information (Inter-RAT Logged MDT) across multiple RATs by the Logged MDT (Trace Activation Request for Inter-RAT). More specifically, for example, the network operation management apparatus EM(S) requests the radio base station eNB or the base station control station RNC/base station NB to execute the following operations.

A) Giving an instruction to the radio terminal UE, which is selected as a target for executing the Logged MDT in RAT-A, to execute the Logged MDT in RAT-A.

B) Instructing the radio terminal UE to report a log obtained in the RAT-A after the radio terminal UE moves to the different RAT-B.

C) Requesting the radio terminal UE to execute the Logged MDT in the RAT-B continuously.

Step S803: By way of the packet core network EPC42 of LTE and the core network CN44 of UMTS, the home subscriber management sever HSS41 notifies the radio base station eNB43 and the base station control station RNC/base station NB45, serving under the packet core network EPC42 and the core network CN44 respectively, of user consent information related to reporting of the detailed location information (e.g. GPS) of the radio terminal UE46 in the Logged MDT. Herein, the user consent information includes information such as "Consent" in the case when the radio terminal UE agrees to reporting of the detailed location registration, and "Unconsent" in the case when not agreeing.

Step S804: The radio base station eNB43 selects the radio terminal UE46 that is instructed to execute the Logged MDT according to the start request from the network operation management apparatus EM(S)40, terminal capability information of the radio terminal UE46 and the user consent information (UE selection).

Step S805: In addition to obtaining and reporting of the measurement information in the LTE cell, the radio base station eNB43 reports in the UMTS cell the measurement information obtained in the LIE cell, and transmits a message for requesting to execute to obtain and report the measurement information in the UMTS cell to the selected radio terminal UE56 (Logged Measurement Configuration for Inter-RAT). Herein, in addition to transmission of the first configuration information that is an instruction to obtain and report the measurement information in the LTE cell (Logged Measurement Configuration for LTE), the message is transmitted by any of the following three methods.

a) Transmission of a request (Logging continuation request for UMTS) for obtaining and reporting the measurement information in the UMTS cell;

b) Transmission of the second configuration information necessary for obtaining the measurement information in the UMTS cell (Logged Measurement Configuration for UMTS); and c) Transmission of a) or b), and a message (Inter-RAT Log Report Indication) that includes information for instructing to report the measurement information, which is obtained in the LTE cell, in the UMTS cell.

Step S806: The radio base station eNB43 instructs the radio terminal UE46 to go to an idle state (RRC Idle) at a predetermined timing (RRC Connection Release).

Step S807: The radio terminal UE46 obtains the measurement information in the LTE cell (Log measurement results).

Step S808: The radio terminal UE46 executes a cell reselection from the LTE cell to the UMTS cell when a predetermined trigger for the cell reselection is happened (Cell reselection to UMTS cell).

Step S809: The radio terminal UE46 establishes a RRC connection with the base station control station RNC/base station NB45 when a predetermined trigger for the RRC connection is happened, and reports a stored log (RRC Connection Establishment and Log Retrieval). At this time, the radio terminal UE46 reports the stored log with the addition of information for distinguishing a log obtained in the LTE cell from a log obtained in the UMTS cell.

Step S810: The base station control station RNC/base station NB45 transfers the log collected from the radio terminal UE46 to the trace information collecting apparatus TCE47 (Trace Record Reporting).

Step S811: The base station control station RNC/base station NB45 updates location registration (Location Update).

Step S812: The radio terminal UE46 transmits a message for reporting to the base station control station RNC/base station NB44, the message that has received a request to execute the Logged MDT in the UMTS cell from the radio base station eNB of LTE. The base station control station RNC/base station NB44 determines whether to let the radio terminal UE46 to execute the Logged MDT, and transmits a message to execute the Logged MDT when letting the radio terminal UE46 to execute the Logged MDT, and continue letting the radio terminal UE46 to obtain (report) the measurement information in the UMTS cell (Logging Continuation Configuration).

Herein, the message by the radio terminal UE46 is transmitted, for example, by any of the following two methods.

A) Reporting of a message including information that indicates storing the configuration information for the Logged MDT in the UMTS cell; and B) Reporting of a message that includes configuration information for the Logged MDT, which is received in the LTE cell, in the UMTS cell.

On the other hand, the message by the base station control station RNC/base station NB44 is transmitted by any of the following two methods.

C) Notification of a message that includes an instruction to continue obtaining measurement information by the Logged MDT in the UMTS cell; and D) Notification of a message that includes configuration information for the Logged MDT in the UMTS cell.

Step S813: The base station control station RNC/base station NB44 instructs the radio terminal UE46 to change to an idle state (UMTS Idle) at a predetermined timing, and the radio terminal UE46 releases a RRC connection and goes to an idle state (RRC Connection Release).

Step S814: The radio terminal UE46 obtains the measurement information by the Logged MDT in the UMTS cell (Log measurement results in UMTS cell).

The foregoing steps allow the continual obtainment (acquisition) of measurement information to be realized, even when the radio terminal UE moves between different radio access technologies (RATs). This makes it possible to understand radio wave environments in the area where the radio terminal moves between the cells of different RATs, or around the area, thereby enabling to realize coverage optimization or mobility optimization, which takes the cells of multiple RATs into consideration. Further, when the first RAT is UMTS and the second RAT is LTE, the operation similar to that of the radio base station eNB of LTE may be performed by the base station control station RNC/base station NB of UMTS and the operation similar to that of the packet core network EPC of LTE may be performed by the core network CN of UMTS. Similarly, the operation similar to that of the base station control station RNC/base station NB of UMTS may be performed by the radio base station eNB of LTE and the operation similar to that of the core network CN of UMTS may be performed by the packet core network EPC of LTE.

<Modification of Exemplary Embodiment 8>

Figure 19:
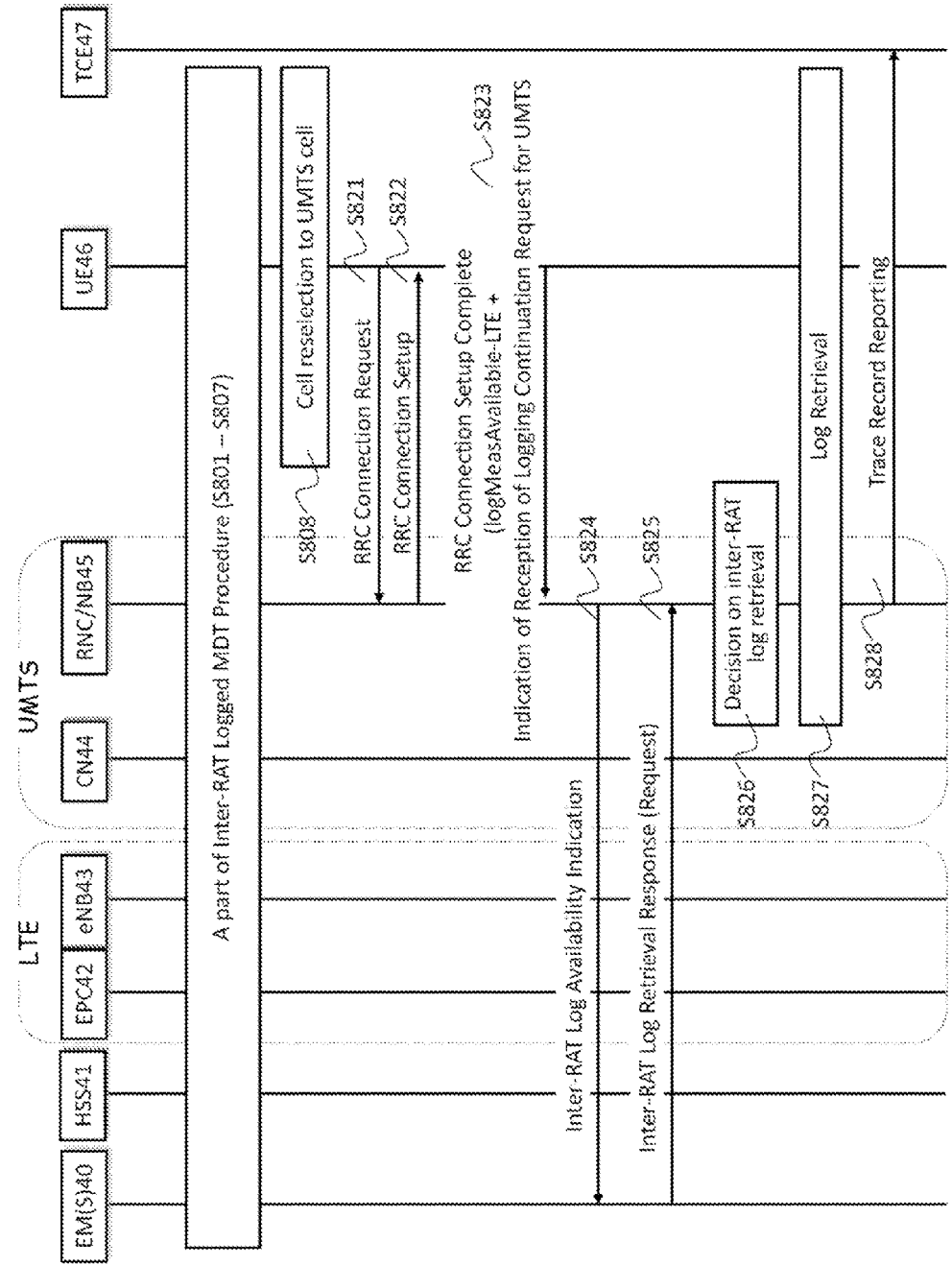
FIG. 19 is a sequence diagram illustrating operations of a radio network and a radio terminal in accordance with a modification in an eighth exemplary embodiment of the present invention.

In the eighth exemplary embodiment shown in FIG. 19, the base station control station RNC/base station NB of UMTS, which is the second RAT, collects logs from the radio terminal UE by steps similar to the Logged MDT in the same conventional RAT, but a network operation shown in FIG. 19 may be performed.

In FIG. 19, it is assumed that the operations of steps S801 to S807 are performed, and that the radio terminal UE executes a cell reselection at a predetermined timing.

Step S808: The radio terminal UE36 executes a cell reselection from the LTE cell to the UMTS cell when a predetermined trigger for the cell reselection is happened (Cell reselection to UMTS cell).

Step S821: The radio terminal UE46 requests the base station control station RNC/base station NB45 to establish a RRC connection (RRC Connection Request).

Step S822: The base station control station RNC/base station NB45 notifies the radio terminal UE46 of control information for establishing a RRC connection (RRC Connection Setup).

Step S823: The radio terminal UE46 performs a report to the base station control station RNC/base station NB45, necessary configurations for establishing a RRC connection are completed according to the control information (RRC Connection Setup Complete). At this time, it is reported to store a log (that is, log is available) obtained in the LTE cell (logMeasAvailable-LTE), and receive a request (Indication of Reception of Logging Continuation Request for UMTS) to continue obtaining the measurement information in the UMTS cell (that is, Logged MDT).

Step S824: The base station control station RNC/base station NB45 notifies the network operation management apparatus EM(S)40 of having received a report that a log of different RAT is stored (Inter-RAT Log Availability Indication).

Step S825: The network operation management apparatus EM(S)40 notifies the base station control station RNC/base station NB45 of a response to the report that a log of different RAT is stored (Inter-RAT Log Retrieval Response). The case for letting the radio terminal UE46 to report the log of different RAT (Request) is shown in FIG. 19. Herein, it is conceived that the response performed by EM(S)40 may be performed based on the policy set by an operator in advance, but the present invention is not limited thereto.

Step S826: The base station control station RNC/base station NB45 determines whether to let the radio terminal UE46 to report a log generated in the LTE cell (Decision on inter-RAT log retrieval). Herein, it is conceived that the method to make a determination may be performed based on, for example, whether to have received an instruction (request) to let the radio terminal UE 46 to perform a report from the core network CN, or whether to need to execute the Logged MDT over the cells of different RATs, or the like.

Step S827: The base station control station RNC/base station NB45 instructs the radio terminal UE46 to report the log obtained in the LTE cell, and the radio terminal UE46 reports the log (Log Retrieval).

Step S828: The base station control station RNC/base station NB45 transfers the log collected from the radio terminal UE46 to the trace information collecting apparatus TCE47 (Trace Record Reporting).

The foregoing steps allow to determine whether to report obtained logs of the measurement information depending on the radio network environments or supported functions, in a system that the radio terminal UE obtains measurement information continuously while moving to perform a cell reselection between the different radio technologies (RATs). Note that the operations of steps S824 and S825 may be omitted, and the core network CN (packet core network EPC in the case of LTE) may perform instead of the network operation management apparatus EM(S).

<Exemplary Embodiment 9>

A ninth embodiment of the present invention will be described.

Figure 20:
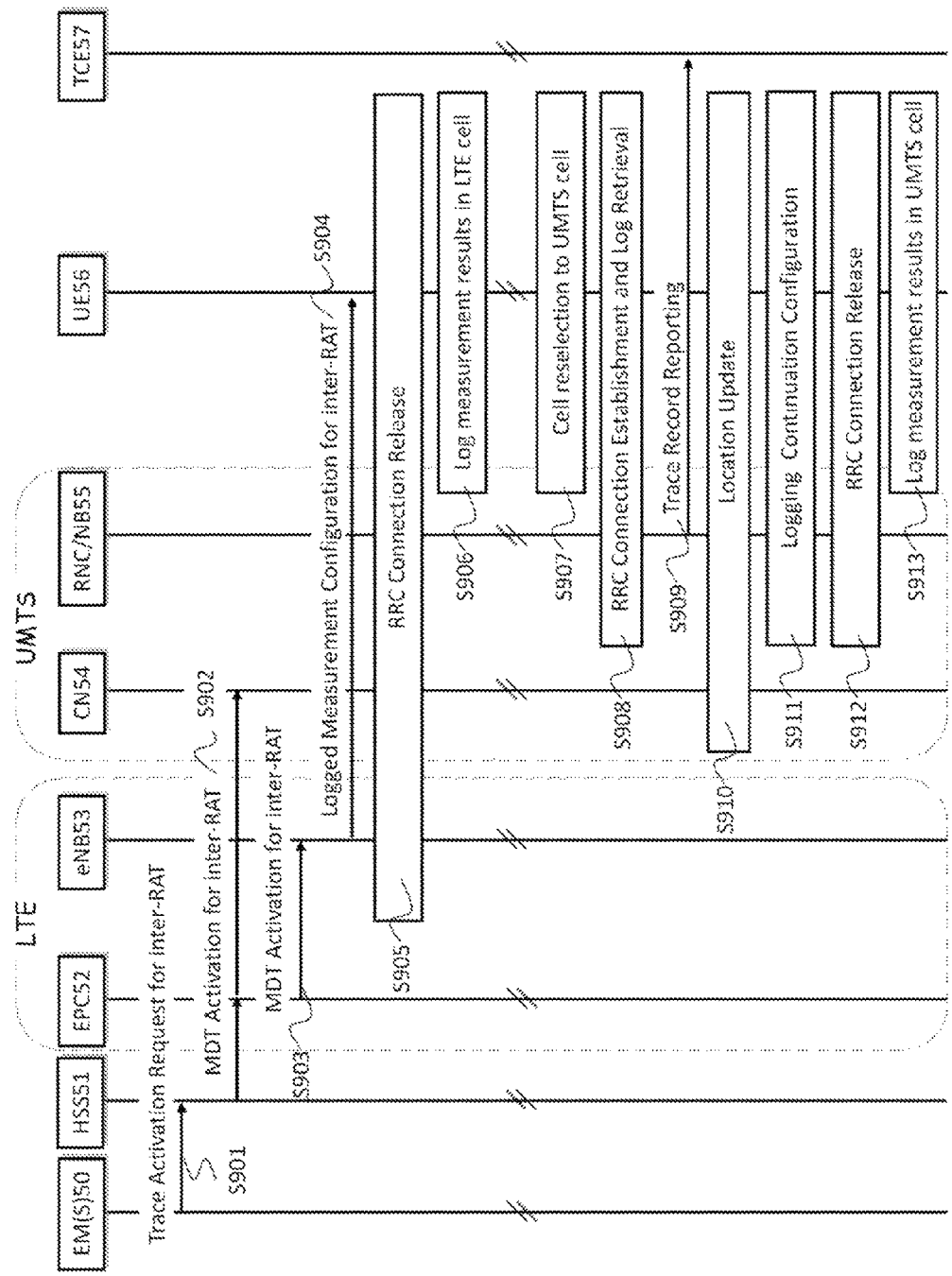
FIG. 20 is a sequence diagram illustrating operations of a radio network and a radio terminal in accordance with a ninth exemplary embodiment of the present invention.

FIG. 20 is a sequence diagram illustrating operations of a radio network and a radio terminal in accordance with a ninth exemplary embodiment of the present invention. FIG. 20 assumes a radio communication system that includes the network operation management apparatus EM(S)50, the home subscriber management server HSS51, the packet core network EPC52 of LTE that is the first Radio Access Technology (RAT), the radio base station eNB53, the core network CN54 of UMTS that is the second RAT, the base station control station RNC/base station NB55, the radio terminal UE56, and the trace information collecting apparatus TCE57. The MDT method uses Logged MDT of the signaling based method. In the ninth exemplary embodiment, as is the case with the eighth exemplary embodiment (that is, the sixth and seventh exemplary embodiments), the radio base station eNB of LTE requests the radio terminal UE to execute the Logged MDT after the radio terminal UE36 moves to the UMTS cell, in addition to an instruction of the Logged MDT in the LTE cell and an instruction to report the log in the UMTS cell when the radio terminal UE36 moves to the UMTS cell while storing the log generated in the LTE cell. Note that, the present invention may be of course applied to the case when performing the method similar to that of the fifth exemplary embodiment, in addition to these exemplary embodiments.

Step S901: The network operation management apparatus EM(S)50 requests the home subscriber management server HSS51 to collect terminal measurement information (Inter-RAT Logged MDT) across multiple RATs for the specified radio terminal UE56 by the Logged MDT (Trace Activation Request for Inter-RAT). More specifically, for example, the network operation management apparatus EM(S) requests the radio base station eNB or the base station control station RNC/base station NB to execute the following operations.

A) Giving an instruction to the radio terminal UE, which is selected as a target for executing the Logged MDT in RAT-A, to execute the Logged MDT in RAT-A.

B) Instructing the radio terminal UE to report a log obtained in the RAT-A after the radio terminal UE moves to the different RAT-B.

C) Requesting the radio terminal UE to execute the Logged MDT in the RAT-B continuously.

Herein, the method for identifying the radio terminal UE may be an IMSI (International Mobile Subscriber Identity) that is a terminal individual ID, an IMEI (International Mobile Equipment Identity), or the like.

Step S902: The home subscriber management server HSS51 transfers an instruction of the Inter-RAT Logged MDT to the packet core network EPC52 of LTE managing an area where the radio terminal UE56 to be a target of the Logged MDT is registered, and to the core network CN54 of UMTS (MDT Activation for Inter-RAT).

Step S903: The packet core network EPC52 of LTE transfers an instruction of the Inter-RAT Logged MDT to the radio base station eNB53 under the control of which the radio terminal UE56 to be a target may exist (MDT Activation for Inter-RAT).

Step S904: In addition to obtaining and reporting the measurement information in the LTE cell, the radio base station eNB53 in which the radio terminal UE56 to be a target exists reports the measurement information, which is obtained in the LTE cell, in the UMTS cell, and transmits a message for requesting to execute to obtain and report the measurement information in the UMTS cell to the radio terminal UE56 (Logged Measurement Configuration for Inter-RAT).

Herein, in addition to transmission of the first configuration information that is an instruction to obtain and report the measurement information in the LTE cell (Logged Measurement Configuration for LTE), the message is transmitted by any of the following three methods.

a) Transmission of a request (Logging continuation request for UMTS) for obtaining and reporting the measurement information in the UMTS cell;

b) Transmission of the second configuration information necessary for obtaining the measurement information in the UMTS cell (Logged Measurement Configuration for UMTS); and c) Transmission of a) or b), and a message (Inter-RAT Log Report Indication) that includes information for instructing to report the measurement information, which is obtained in the LTE cell, in the UMTS cell.

Step S905: The radio base station eNB53 instructs the radio terminal UE56 to go to an idle state (RRC Idle) at a predetermined timing (RRC Connection Release).

Step S906: The radio terminal UE56 obtains the measurement information by the Logged MDT in the LTE cell (Log measurement results in LTE cell).

Step S907: The radio terminal UE56 executes a cell reselection from the LTE cell to the UMTS cell when a predetermined trigger for the cell reselection is happened (Cell reselection to UMTS cell).

Step S908: The radio terminal UE56 establishes a RRC connection with the base station control station RNC/base station NB55 when a predetermined trigger for the RRC connection is ON, and reports a stored log (RRC Connection Establishment and Log Retrieval). At this time, the radio terminal UE56 reports the stored log with the addition of information for distinguishing a log obtained in the LTE cell from a log obtained in the UMTS cell.

Step S909: The base station control station RNC/base station NB55 transfers the log collected from the radio terminal UE56 to the trace information collecting apparatus TCE57 (Trace Record Reporting).

Step S910: The base station control station RNC/base station NB45 updates location registration (Location Update).

Step S911: The radio terminal UE46 transmits a message for reporting to the base station control station RNC/base station NB44, the message that has received a request to execute the Logged MDT in the UMTS cell from the radio base station eNB of LTE. The base station control station RNC/base station NB44 determines whether to let the radio terminal UE46 to execute the Logged MDT, and transmits a message to execute the Logged MDT when letting the radio terminal UE46 to execute the Logged MDT, and continue letting the radio terminal UE46 to obtain (report) the measurement information in the UMTS cell (Logging Continuation Configuration).

Herein, the message by the radio terminal UE46 is transmitted, for example, by any of the following two methods.

A) Reporting of a message including information that indicates storing the configuration information for the Logged MDT in the UMTS cell; and B) Reporting of a message that includes configuration information for the Logged MDT, which is received in the LTE cell, in the UMTS cell.

On the other hand, the message by the base station control station RNC/base station NB44 is transmitted by any of the following two methods.

C) Notification of a message that includes an instruction to continue obtaining measurement information by the Logged MDT in the UMTS cell; and D) Notification of a message that includes configuration information for the Logged MDT in the UMTS cell.

Step S912: The base station control station RNC/base station NB44 instructs the radio terminal UE46 to change to an idle state (UMTS Idle) at a predetermined timing, and the radio terminal UE46 releases a RRC connection and goes to an idle state (RRC Connection Release).

Step S913: The radio terminal UE56 obtains the measurement information in the UMTS cell (Log measurement results in UMTS cell).

The foregoing steps allow to realize continual obtainment (acquisition) of measurement information even when the radio terminal UE moves between different radio access technologies (RATs). This makes it possible to understand radio wave environments in the area where the radio terminal moves between the cells of different RATs, or around the area, thereby enabling to realize coverage optimization or mobility optimization, which takes the cells of multiple RATs into consideration. Further, when the first RAT is UMTS and the second RAT is LTE, the operation similar to that of the radio base station eNB of LTE may be performed by the base station control station RNC/base station NB of UMTS and the operation similar to that of the packet core network EPC of LTE may be performed by the core network CN of UMTS. Similarly, the operation similar to that of the base station control station RNC/base station NB of UMTS may be performed by the radio base station eNB of LTE and the operation similar to that of the core network CN of UMTS may be performed by the packet core network EPC of LTE.

<Modification of Exemplary Embodiment 9>

Figure 21:
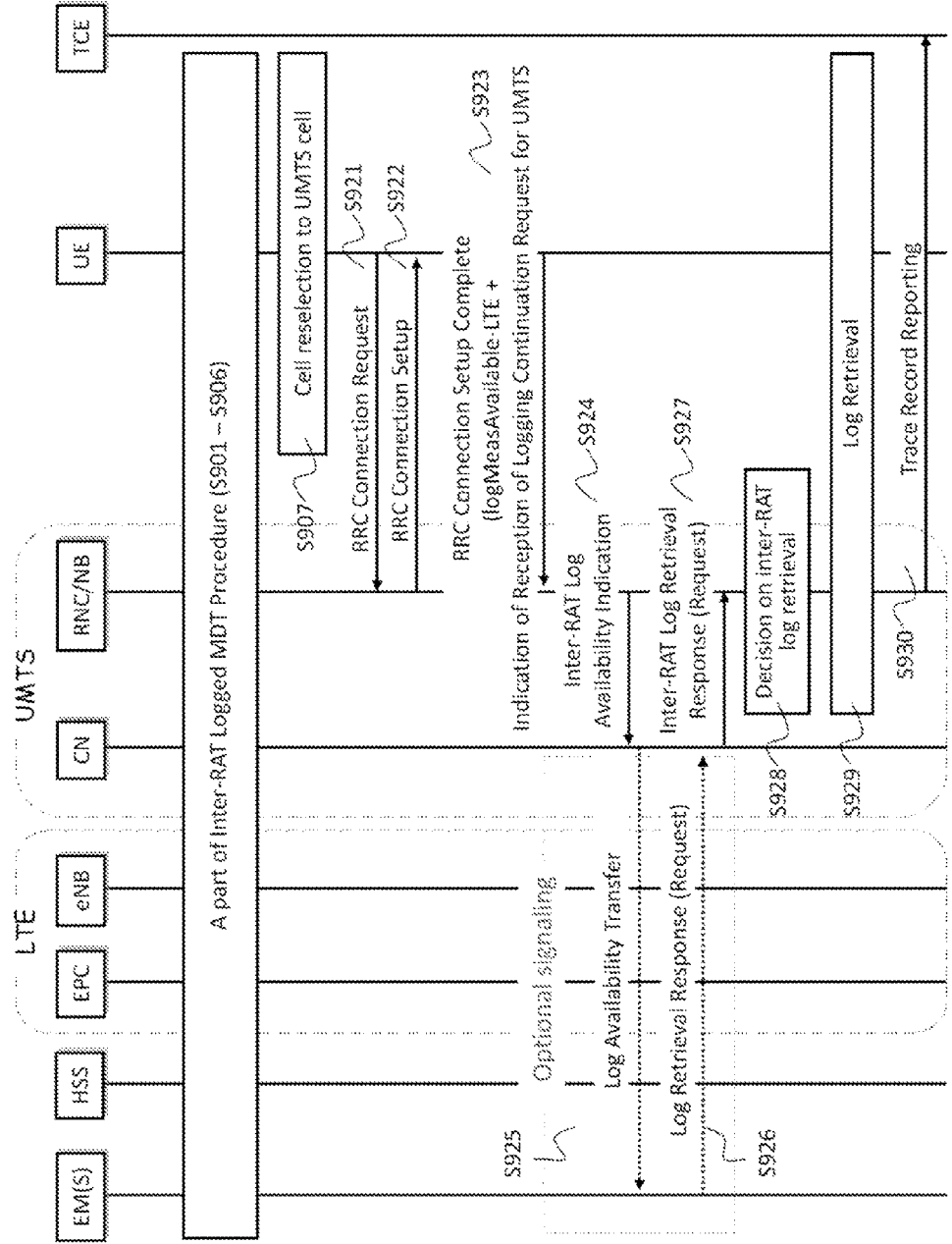
FIG. 21 is a sequence diagram illustrating operations of a radio network and a radio terminal in accordance with a modification in a ninth exemplary embodiment of the present invention.

In the ninth exemplary embodiment shown in FIG. 20, the base station control station RNC/base station NB of UMTS, which is the second RAT, collects logs from the radio terminal UE by steps similar to the Logged MDT in the same conventional RAT, and a network operation shown in FIG. 21 may be performed.

In FIG. 21, it is assumed that the operations of steps S901 to S906 are performed, and the radio terminal UE executes a cell reselection at a predetermined timing.

Step S907: The radio terminal UE36 executes a cell reselection from the LTE cell to the UMTS cell when a predetermined trigger for the cell reselection is happened (Cell reselection to UMTS cell).

Step S921: The radio terminal UE46 requests the base station control station RNC/base station NB45 to establish a RRC connection (RRC Connection Request).

Step S922: The base station control station RNC/base station NB45 notifies the radio terminal UE46 of control information for establishing a RRC connection (RRC Connection Setup).

Step S923: The radio terminal UE46 performs a report to the base station control station RNC/base station NB45, necessary configurations for establishing a RRC connection are completed according to the control information (RRC Connection Setup Complete). At this time, it is reported to store a log (that is, log is available) obtained in the LTE cell (logMeasAvailable-LTE), and receive a request (Indication of Reception of Logging Continuation Request for UMTS) to continue obtaining the measurement information in the UMTS cell (that is, Logged MDT).

Step S924: The base station control station RNC/base station NB45 notifies the core network CN of having received a report that a log of different RAT are stored (Inter-RAT Log Availability Indication).

Step S925: The core network CN transfers to the network operation management apparatus EM(S)40, a report that the radio terminal UE stores the notified log of different RAT (Log Availability Transfer).

Step S926: The network operation management apparatus EM(S)40 notifies the core network CN of a response to the transferred message for the report that a log of different RAT is stored (Log Retrieval Response). The case for letting the radio terminal UE46 to report the log of different RAT (Request) is shown in FIG. 21. Herein, it is conceived that the response by EM(S)40 may be performed based on the policy set by an operator in advance, but the present invention is not limited thereto.

Step S927: The core network CN notifies the base station control station RNC/base station NB45 of a response to storing the log of different RAT (Inter-RAT Log Retrieval Response). The case for utilizing the radio terminal UE46 for reporting the log of different RAT (Request) is shown in FIG. 21.

Step S928: The base station control station RNC/base station NB45 determines whether to let the radio terminal UE46 to report a log generated in the LTE cell (Decision on inter-RAT log retrieval). Herein, it is conceived that the method to make a determination may be performed based on, for example, whether to have received an instruction (request) to let the radio terminal UE 46 to report from the core network CN, or whether to need to execute the Logged MDT across the cells of different RATs, or the like.

Step S929: The base station control station RNC/base station NB45 instructs the radio terminal UE46 to report the log obtained in the LTE cell, and the radio terminal UE46 reports the log (Log Retrieval).

Step S930: The base station control station RNC/base station NB45 transfers the log collected from the radio terminal UE46 to the trace information collecting apparatus TCE47 (Trace Recording Reporting).

The foregoing steps allow to determine whether to report obtained logs of the measurement information depending on the radio network environments or supported functions, in a system that the radio terminal UE obtains measurement information continuously while moving to perform a cell reselection between the different radio technologies (RATs). Note that, the operations of steps S 925 and S926 may be omitted, and the core network CN (packet core network EPC in the case of LTE) may perform instead of the network operation management apparatus EM(S).

In the embodiments of the present invention described above, the descriptions are made on the assumption that the network operation management apparatus EM(S) and the trace information collecting apparatus TCE are common between the radio access technologies (RATs). However, the present invention can be applied to the case when EM(S) and TCE are different on per RAT. For example, when the EM(S) is different on per RAT, the EM(S) is able to use a method for notifying a request to obtain measurement information in the second RAT (Logged MDT) while notifying the first configuration information related to obtaining measurement information in the first RAT (Logged MDT). Meanwhile, when the TCE is different on per RAT, for example, the present invention is able to use the method for indicating only the first RAT in relation to TCE information (e.g. TCE IP Address or ICE ID) indicated by the EM(S) in trace related information, specifying the TCE based on ICE information of the first RAT and reporting, when collecting measurement information from the radio terminal UE in the radio station of the second RAT (base station eNB or base station control station RNC/base station NB). Further, when a radio station of the second RAT cannot identify the TCE from TCE information, the process is conceived not to collect the measurement information, or to discard the measurement information even when collecting. Moreover, the process is conceived that the radio station of the second RAT inquires an upper network apparatus such as EM(S) or EPC/CN whether the TCE is necessary, or whether to need to collect measurement information of the different RATs.

This is the end of the descriptions of the embodiments and exemplary embodiments of the present invention, and as is apparent from the above-descriptions, each unit may be configured 30: with hardware or may be realized by a computer program. In this case, the functions and operations similar to the embodiments and exemplary embodiments described above are realized by a processor under s program stored in a program memory. Only one part of the above-described functions of the embodiments or exemplary embodiment can be realized with the computer program.

One part or an entirety of the above embodiments can be described as the following supplementary notes, but the present invention is not limited to the followings.

(Supplementary Note 1) A radio communication system that a radio terminal obtains measurement information indicated by a radio network in an idle state, and reports the obtained measurement information in an active state, the radio communication system comprising: a first radio station managing a first cell of a first Radio Access Technology comprises in the first cell; notification means configured to notify the radio terminal of the first configuration information related to obtainment of the measurement information in the first cell; and instruction means configured to instruct the radio terminal to report information related to the measurement information obtained in the first cell after the radio terminal moves to a second cell of a second Radio Access Technology different from the first Radio Access Technology.

(Supplementary Note 2) The radio communication system according to supplementary note 1 or 2, wherein the radio terminal determines whether the second cell is a target area for obtaining the measurement information, and reports information related to the measurement information when it is a target area.

(Supplementary Note 3) The radio communication system according to supplementary note 1 or 2, wherein the network includes more than one of the radio station, a network apparatus managing the radio station and a network operation management apparatus.

(Supplementary Note 4) A radio station in a radio communication system that a radio terminal obtains measurement information indicated by a network in an idle state, and reports the obtained measurement information in an active state, wherein a first radio station managing a first cell of a first Radio Access Technology comprises notification means configured to notify a radio terminal in the first cell of the first configuration information related to obtainment of the measurement information in the first cell; and instruction means configured to instruct the radio terminal to report information related to the measurement information obtained in the first cell after the radio terminal moves to the second cell of a second Radio Access Technology different from the first Radio Access Technology, and a second radio station managing a second cell comprises receiving means that receives a report of information related to the first measurement information from the radio terminal; and collecting means that instructs the radio terminal to report the first measurement information.

(Supplementary Note 5) The radio station according to supplementary note 4, wherein the second radio station inquires an upper network apparatus or a network operation management apparatus whether to need to collect the first measurement information when receiving a report of storing the first measurement information, and receives a response to the inquiry from the upper network apparatus or the network operation management apparatus to determine whether the first measurement information is reported or not according to the response.

(Supplementary Note 6) A network apparatus that instructs a radio station to let a radio terminal to obtain measurement information in an idle state, and report the obtained measurement information in an active state, comprising: notification means configured to notify a radio station managing a first cell of a first Radio Access Technology where the radio terminal stays, of the first configuration information related to obtainment of the measurement information in the first cell by the radio terminal; and instruction means configured to instruct the radio station to let the radio terminal to report information related to the measurement information obtained in the first cell after the radio terminal moves to a second cell of a second Radio Access Technology different from the first Radio Access Technology.

(Supplementary Note 7) The network apparatus according to supplementary note 7, further receiving a request of the notification or the request for the radio station from a network operation management apparatus for execution.

(Supplementary Note 8) The network apparatus according to supplementary note 6 or 7, further receiving terminal selection means configured to select a radio terminal to be instructed to be a target to report measurement information in the first cell after the radio terminal moves to the second cell, and performs the instruction to the radio station having the selected radio terminal under control.

(Supplementary Note 9) The network apparatus according to supplementary note 8, wherein the terminal selection means selects the radio terminal based on consent information related to reporting of location information of the radio terminal.

Above, while the present invention has been particularly shown and described with reference to embodiments and exemplary embodiment, the present invention is not limited to the above mentioned embodiments and exemplary embodiments. It will be understood by those of ordinary skill in the art that various changes in form and details may be made therein without departing from the spirit and scope of the present invention. In addition, an appropriate combination of the embodiments or exemplary embodiments may be employed.

This application is based upon and claims the benefit of priority from Japanese patent application No. 2011-218705, filed on Sep. 30, 2011, the disclosure of which is incorporated herein in its entirety by reference.

REFERENCE SIGNS LIST

1 First radio station
2 First cell
3 Second radio station
4 Second cell
5 Radio terminal
10 Receiver
11 Demodulator
12 Measurement control unit
13 Signal generator
14 Transmitter
20 Receiver
21 Demodulator
22 Measurement unit
23 Signal generator
24 Transmitter

The invention claimed is:

1. A radio communication system that a radio terminal obtains measurement information indicated by a radio network in an idle state, and reports the obtained measurement information in an active state, the radio communication system comprising:
a first radio station configured to manage a first cell of a first radio access technology, comprising:
a memory storing instructions; and
a processor configured to execute the instructions to:
notify the radio terminal of first configuration information related to obtainment of first measurement information in the first cell;
instruct the radio terminal to report information related to the first measurement information obtained in the first cell after the radio terminal moves to a second cell of a second radio access technology different from the first radio access technology; and
request the radio terminal to obtain second measurement information in the second cell after the radio terminal moves to the second cell,
wherein the radio terminal reports to a second radio station:
a request reception notification that indicates reception of the request, or
second configuration information notified from the first radio station, the second configuration information being related to the obtainment of the second measurement information in the second cell.

2. The radio communication system according to claim 1, wherein, to instruct the radio terminal to report information related to the first measurement information obtained in the first cell, the processor is further configured to execute the instructions to instruct the radio terminal to report, as information related to the first measurement information obtained in the first cell, whether the first measurement information obtained in the first cell is stored.

3. The radio communication system according to claim 1, wherein the processor is further configured to execute the instructions to report to the second radio station managing the second cell, storing the first measurement information obtained in the first cell.

4. The radio communication system according to claim 1, wherein the radio terminal obtains the second measurement information in the second cell by reusing at least some of the first configuration information after moving to the second cell.

5. A radio terminal that obtains first measurement information indicated by a network in an idle state, and reports the obtained first measurement information in an active state, the radio terminal comprising:
a memory storing instructions; and
a processor configured to execute the instructions to:
receive first configuration information related to obtainment of the first measurement information in a first cell from a first radio station managing the first cell of a first radio access technology;
receive an instruction to report information related to the first measurement information obtained in the first cell after moving to a second cell of a second radio access technology different from the first radio access technology;
report information related to the first measurement information in the second cell according to the instruction;
obtain second measurement information in the second cell according to a request from the first radio station to obtain the second measurement information in the second cell, after moving to the second cell;
receive, from the first radio station, a request including at least one of a message indicating the request and a notification message of second configuration information related to the obtainment of the second measurement information in the second cell; and
report to a second radio station:
a request reception notification that indicates reception of the request, or
the second configuration information notified from the first radio station.

6. The radio terminal according to claim 5, wherein, to report the information related to the first measurement information in the second cell, the processor is further configured to execute the instructions to:
report the first measurement information to the second radio station managing the second cell, the second radio station storing the first measurement information as information related to the first measurement information obtained in the first cell.

7. The radio terminal according to claim 6, wherein, to report the information related to the first measurement information in the second cell, the processor is further configured to execute the instructions to:
report in the second cell, the first measurement information including an identifier of the first radio access technology.

8. The radio terminal according to claim 5, wherein the processor is further configured to execute the instructions to:
store, in advance, information on a first measurement item and a second measurement item that serve as an obtainment target of the measurement information in each of the first cell and the second cell; and
change an obtainment target from the first item to the second item after moving from the first cell to the second cell.

9. The radio terminal according to claim 5, wherein the processor is further configured to execute the instructions to obtain the second measurement information in the second cell by reusing at least some of the first configuration information after moving to the second cell.

10. The radio terminal according to claim 5, wherein, to obtain the first measurement information, the processor is further configured to
execute the instruction to obtain at least one of an absolute time, a logging duration, a logging interval, and a trace related information.

11. The radio terminal according to claim 10, wherein, to obtain the first measurement information, the processor is further configured to execute the instructions to:
measure at least one of the logging duration and the logging interval by a timer; and
continue at least one of a timer value for measuring the logging duration and a timer value for measuring the logging interval.

12. A radio terminal that obtains first measurement information indicated by a network in an idle state, and reports the obtained first measurement information in an active state, the radio terminal comprising:
a memory storing instructions; and
a processor configured to execute the instructions to:
receive first configuration information related to obtainment of the first measurement information in a first cell from a first radio station managing the first cell of a first radio access technology;
receive an instruction to report information related to the first measurement information obtained in the first cell after moving to a second cell of a second radio access technology different from the first radio access technology;
report information related to the first measurement information in the second cell according to the instruction;
add information indicating radio access technology corresponding to the obtained first measurement information when reporting the first measurement information; and
obtain second measurement information in the second cell according to a request from the first radio station to obtain the second measurement information in the second cell after moving to the second cell.

13. A radio station in a radio communication system that a radio terminal obtains first measurement information indicated by a network in an idle state, and reports the obtained first measurement information in an active state, wherein the radio station is a first radio station, manages a first cell of a first radio access technology, and comprises:
a memory storing instructions; and
a processor configured to execute the instructions to:
notify the radio terminal in the first cell of first configuration information related to obtainment of the first measurement information in the first cell;

instruct the radio terminal to report information related to the first measurement information obtained in the first cell after the radio terminal moves to a second cell of a second radio access technology different from the first radio access technology; and request the radio terminal to obtain second measurement information in the second cell after the radio terminal moves to the second cell, wherein the radio terminal reports to a second radio station:
- a request reception notification that indicates reception of the request, or
- second configuration information notified from the first radio station, the second configuration information being related to the obtainment of the second measurement information in the second cell.

14. The radio station according to claim 13, wherein, to instruct the radio terminal to report information related to the first measurement information obtained in the first cell, the processor is further configured to execute the instructions to instruct the radio terminal to report, as information related to the first measurement information obtained in the first cell, whether the first measurement information obtained in the first cell is stored.

15. A network apparatus that instructs a first radio station to let a radio terminal to obtain first measurement information in an idle state, and to report the obtained first measurement information in an active state, the network apparatus comprising:

a memory storing instructions; and a processor configured to execute the instructions to:

notify the first radio station managing a first cell of a first radio access technology where the radio terminal stays of configuration information related to obtainment of the first measurement information in the first cell by the radio terminal;

instruct the first radio station to let the radio terminal to report information related to the first measurement information obtained in the first cell after the radio terminal moves to a second cell of a second radio access technology different from the first radio access technology; and instruct the first radio station to let the radio terminal to obtain second measurement information in the second cell after the radio terminal moves to the second cell, wherein the radio terminal reports to the second radio station:
- a request reception notification that indicates reception of the request, or
- second configuration information notified from the first radio station, the second configuration information being related to the obtainment of the second measurement information in the second cell.

16. An information collecting method of a radio terminal for obtaining measurement information indicated by a radio network in an idle state, and reporting the obtained measurement information in an active state, the method comprising:

notifying, in a first cell of a first radio access technology, the radio terminal of first configuration information related to obtainment of the measurement information in the first cell;

requesting the radio terminal to report information related to the measurement information obtained in the first cell after the radio terminal moves to a second cell of a second radio access technology different from the first radio access technology; and requesting the radio terminal to obtain second measurement information in the second cell after the radio terminal moves to the second cell, wherein the radio terminal reports to a second radio station:
- a request reception notification that indicates reception of the request, or
- second configuration information notified from a first radio station, the second configuration information being related to the obtainment of the second measurement information in the second cell.

17. An information collecting method of a radio terminal for obtaining measurement information indicated by a radio network in an idle state, and reports the obtained measurement information in an active state, the method comprising:

receiving, from a first radio station managing a first cell of a first radio access technology in which the radio terminal stays, configuration information related to obtainment of the measurement information in the first cell and an instruction to report information related to the measurement information obtained in the first cell after the radio terminal moves to a second cell of a second radio access technology different from the first radio access technology;

reporting, to a second radio station managing the second cell, the information related to the measurement information according to the instruction;

receiving a request from the first radio station to obtain second measurement information in the second cell, after moving to the second cell;

obtaining the second measurement information in the second cell according to the request;

receiving, from the first radio station, a request including at least one of a message indicating the request and a notification message of second configuration information related to the obtainment of the second measurement information in the second cell; and reporting to the second radio station:
- a request reception notification that indicates reception of the request, or
- the second configuration information notified from the first radio station.

* * * * *